(12) United States Patent  (10) Patent No.: US 8,050,505 B2
Hirohata et al.  (45) Date of Patent: Nov. 1, 2011

(54) IMAGE PROCESSING APPARATUS, IMAGE PROCESSING SYSTEM, IMAGE PROCESSING METHOD, AND IMAGE FORMING APPARATUS

(75) Inventors: Hitoshi Hirohata, Hashimoto (JP); Masakazu Ohira, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 762 days.

(21) Appl. No.: 12/221,044

(22) Filed: Jul. 30, 2008

(65) Prior Publication Data

US 2009/0034847 A1   Feb. 5, 2009

(30) Foreign Application Priority Data

Aug. 1, 2007   (JP) ................................. 2007-200707
Jan. 21, 2008   (JP) ................................. 2008-010941

(51) Int. Cl.
*G06K 9/68* (2006.01)
*H04N 1/40* (2006.01)
*G10L 15/00* (2006.01)

(52) U.S. Cl. .......................... 382/219; 358/448; 704/239
(58) Field of Classification Search .................. 382/100, 382/162, 190, 218, 219, 235, 276, 305, 307; 358/2.1, 3.23, 3.28, 448, 462, 530; 701/28; 704/239; 707/749, 758, 999.005, 999.006
See application file for complete search history.

(56) References Cited

U.S. PATENT DOCUMENTS 5,465,353 A * 11/1995 Hull et al. .............................. 1/1
7,002,709 B1 * 2/2006 Terada et al. ................. 358/3.28
2002/0131080 A1  9/2002 Enomoto

FOREIGN PATENT DOCUMENTS

| EP | 1 914 680 A1 | 4/2008 |
| JP | 11-46299 A | 2/1999 |
| JP | 2002-277984 A | 9/2002 |
| JP | 2003-187215 A | 7/2003 |
| JP | 2003-233279 A | 8/2003 |
| JP | 2004-54751 A | 2/2004 |
| JP | 2004-350212 A | 12/2004 |
| JP | 2006-174183 A | 6/2006 |
| JP | 2006-261907 A | 9/2006 |

* cited by examiner

*Primary Examiner* — Abolfazl Tabatabai
(74) *Attorney, Agent, or Firm* — Edwards Angell Palmer & Dodge LLP; David G. Conlin; David A. Tucker

(57) ABSTRACT

In a card serving as an external storage device to be inserted into a digital color multi-function printer, features of a reference image and processing rule information indicating processing content to be applied to input image data judged to be similar to the reference image are prestored. Then, in cases where the input image data is judged to be similar to the reference image, the content of a process to be performed on the input image data is controlled in accordance with the processing rule information corresponding to the reference image. This makes it possible to save users the trouble of setting the content of a process to be performed on input image data, and to prevent a shortage of memory capacity of a memory of the image processing apparatus even in cases where there is an increase in the number of reference images.

22 Claims, 26 Drawing Sheets

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

| HASH VALUE | INDEX INDICATIVE OF DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 11 (b)

| HASH VALUE | INDEX INDICATIVE OF DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

FIG. 16

| INDEX INDICATIVE OF DOCUMENT | INDIVIDUAL PROCESSING RULE | |
|---|---|---|
| ID1 | ELECTRONIC DISTRIBUTION | MAIL ADDRESS 1 |
| ID3 | FILING | PATH 1 TO FOLDER FOR FILING |
| ID4 | FILING | PATH 2 TO FOLDER FOR FILING |
| ID5 | FILING | PATH 3 TO FOLDER FOR FILING |
| ID7 | ELECTRONIC DISTRIBUTION | MAIL ADDRESS 2 |

H11

H12

H13

H14

H21

H22

H23

H24

IMAGE PROCESSING APPARATUS, IMAGE PROCESSING SYSTEM, IMAGE PROCESSING METHOD, AND IMAGE FORMING APPARATUS

This Nonprovisional application claims priority under 35 U.S.C. § 119(a) on Patent Application No. 200707/2007 filed in Japan on Aug. 1, 2007 and Patent Application No. 10941/2008 filed in Japan on Jan. 21, 2008, the entire contents of which are hereby incorporated by reference.

FIELD OF THE INVENTION

The present invention relates to an image processing apparatus and an image processing method each of which allows similarity determination between input image data and prestored image data and allows a control according to the result of the similarity determination.

BACKGROUND OF THE INVENTION

Conventionally, there has been used a technique for comparing (i) input image data obtained by reading a document image with a scanner with (ii) a prestored image, for determining similarity between the input image data and the prestored image, and for, when having determined that the input image data is similar to the prestored image, prohibiting a process (such as copying) from being performed on the input image data.

Examples of a method for determining similarity include: a method for extracting a keyword from an image with use of an OCR (Optical Character Reader) or the like so as to carry out matching with the keyword; a method in which a target image is limited to an image with ruled lines and matching is carried out based on features of the ruled lines; and a method for determining similarity in accordance with distribution of color components of input image data and a reference image.

Furthermore, patent Document 1 (Japanese Unexamined Patent Application Publication No. 282088/1995 (Tokukaihei 7-282088; published on Oct. 27, 1995) discloses a technique in which a descriptor that is invariable to distortion caused by digitalization of an input document or to a difference between the input document and a matching document in a document database is generated based on features of the input document, and matching between the input document and a document in the document database is performed using the descriptor and a descriptor database which stores descriptors and which indicates a list of documents including features from which descriptors are extracted. In the technique, when the descriptor database is scanned, votes for individual documents in the document database are accumulated, and a document with the largest number of votes obtained or a document whose number of votes obtained is over a certain threshold value is considered as a matching document.

Furthermore, an example of a technique for controlling a process for input image data in accordance with the result of similarity determination is as follows: in order to prevent forgery of paper currency or stock certificate by a color image forming apparatus, it is determined whether input image data is identical with image data such as paper currency or stock certificate (reference image) or not based on a pattern extracted from the input image data, and when the input image data is identical with the image data of the reference image, a specific pattern is given to an output image so as to specify the image forming apparatus that carries out copying, a copied image is daubed, or copying is prohibited.

However, although the foregoing technique can limit (e.g., give a specific pattern, daub a copied image, or prohibit copying) the content of a process for input image data in cases where the input image data is similar to the reference image, the foregoing technique sets the content of a process for input image data in such a constant manner (as to give a specific pattern, daubs a copied image, or prohibit copying) in accordance with whether or not the input image data is similar to the reference image. This causes such problems as a low degree of freedom and unavailability.

For example, in recent years, a large number of corporations and the like often have their office provided with multi-function printers each including a copy function, a facsimile function, a filing function, an electronic delivery function, and the like. Further, these multi-function printers are often shared by a plurality of users or a plurality of groups. Moreover, in such a case, it is usual to wish to perform a process (e.g., copying, facsimile transmission, filing, or electronic distribution) on a document (input image data) in accordance with a predetermined processing rule set for each user or each group. Further, it is usual to wish to perform a predetermined process on a document in accordance with the type of the document or the like.

However, the foregoing technique only considers limiting a process for a document in cases where the document is similar to reference image, and cannot set the content of the process in accordance with a result of matching with a user, a group to which the user belongs to, the type of the document, or the like. This makes it necessary for the user to take the trouble to set the content of a process in detail every time he/she performs a process such as copying, facsimile transmission, filing, or electronic distribution on a document.

Further, the foregoing technique makes it necessary to store a reference image or features of the reference image in a memory provided in an image processing apparatus. However, because the memory capacity of the memory of the image forming apparatus is limited, the number of images that can be stored is also limited. For this reason, in particular, in cases where a plurality of users or a plurality of groups shares a single image processing apparatus, the number of images that can be stored by each user or each group is reduced.

Further, when an increase in the number of reference images causes a shortage of memory capacity, a change in memory capacity may be made by replacing a memory. However, it is in fact difficult to replace (i) a memory in which reference images have already been stored with (ii) another memory during use of a system.

SUMMARY OF THE INVENTION

The present invention has been made in view of the foregoing problems, and it is an object of the present invention to save users the trouble of setting the content of a process to be performed on input image data in an image processing apparatus for determining similarity between the input image data and a reference image, and to prevent a shortage of memory capacity of a memory of the image processing apparatus even in cases where there is an increase in the number of reference images.

In order to solve the foregoing problems, a first image processing apparatus of the present invention is an image processing apparatus including: an input data obtaining section for obtaining input image data; a features extracting section for extracting features of the input image data; an information obtaining section for obtaining features of a reference image from an information storage device connected communicably to the image processing apparatus; a similarity determination section for comparing the features of the input image data with the features of the reference image to determine whether or not the input image data is similar to the reference image; and a control section for controlling operation of a processing section for performing a process on the input image data in accordance with a result determined by the similarity determination section, the information obtaining section obtaining, from the information storage device, processing rule information indicating processing content to be applied to input image data judged to be similar to the reference image, the control section controlling, in accordance with the processing rule information corresponding to the reference image, content of a process the processing section performs on the input image data judged to be similar to the reference image.

Further, in order to solve the foregoing problems, a second image processing apparatus of the present invention is an image processing apparatus, including an input data obtaining section for obtaining input image data and a features extracting section for extracting features of the input image data, which includes: an information transmitting section for transmitting, to an information storage device connected communicably to the image processing apparatus, those features of the input image data which have been extracted by the features extracting section; an information obtaining section for obtaining, from the information storage device, processing rule information indicating processing content to be applied to the input image data; and a control section for controlling, in accordance with the processing rule information, operation of a processing section for performing a process on the input image data.

It should be noted that the processing section may be provided inside of the image processing apparatus or connected communicably to the image processing apparatus. Further, the processing section may perform, on the input image data, any one of a copying process, a printing process, an electronic distribution process, a facsimile transmission process, a filing process, an image correction process, a scaling-up/down process, a rotation process, a translation process, a trimming process, a process for combining another image, a data-format conversion process, and an encoding process or a combination of two or more of the processes. Further, the input data obtaining section may obtain input image data, for example, by reading a document with a scanner, may obtain input image data created by inputting necessary information into a format of electronic data with use of software, may obtain input image data created directly as electronic data, or may obtain input image data transmitted from another apparatus connected communicably to the image processing apparatus. Further, the information storage device may be mounted detachably on the image processing apparatus, or may be connected communicably to the image processing apparatus via cable or wirelessly.

The first image processing apparatus is arranged such that: the input data obtaining section obtains input image data; the features extracting section extracts features of the input image data; the information obtaining section obtains features of a reference image from an information storage device connected communicably to the first image processing apparatus; and the similarity determination section compares the features of the input image data with the features of the reference image to determine whether or not the input image data is similar to the reference image. Further, the information obtaining section obtains, from the information storage device, processing rule information indicating processing content to be applied to input image data judged to be similar to the reference image, and the control section controls, in accordance with the processing rule information corresponding to the reference image, the content of a process the processing section performs on the input image data judged to be similar to the reference image.

Further, the second image processing apparatus is arranged such that: the input data obtaining section obtains input image data; the features extracting section extracts features of the input image data; and the information transmitting section transmits the features of the input image data to an information storage device connected communicably to the second image processing apparatus. Moreover, the information obtaining section obtains, from the information storage device, processing rule information indicating processing content to be applied to the input image data, and the control section controls, in accordance with the processing rule information corresponding to a reference image judged to be similar to the input image data, the operation of the processing section for performing a process on the input image data.

With this, according to each of the first and second image processing apparatuses, the process to be performed on the input image data judged to be similar to the reference image can be controlled in accordance with the processing rule information, stored in the information storage device, which corresponds to the reference image. This makes it possible to simplify an operation for a user to set the content of a process to be performed on input image data, and to improve user-friendliness. Further, since the features of the reference image and the processing rule information can be prestored in the information storage device, the required memory capacity of storage means of the image processing apparatus can be reduced in comparison with cases where these pieces of information are stored in the storage means of the image processing apparatus. Further, for example, features of reference images and processing rule information can be stored dispersedly in a plurality of information storage devices. In this case, for example, when stored in each information storage device, features of a reference image and a processing rule can be set according to the needs of a user who owns or uses the information storage device.

In order to solve the foregoing problems, an image processing system of the present invention is an image processing system including: an image processing apparatus which includes an input data obtaining section for obtaining input image data and a control section for controlling content of a process to be performed on the input image data; and an information storage device which includes a storage section for storing features of a reference image, at least either of the image processing apparatus and the information storage device including (i) a features extracting section for extracting features of the input image data and (ii) a similarity determination section for comparing the features of the input image data with the features of the reference image to determine whether or not the input image data is similar to the reference image, the storage section containing, in addition to the features of the reference image, processing rule information indicating processing content to be applied to input image data judged to be similar to the reference image, the control section controlling, in accordance with the processing rule information corresponding to the reference image, a process to be performed on the input image data judged to be similar to the reference image.

The foregoing arrangement is such that: the input data obtaining section obtains input image data; the features extracting section extracts features of the input image; and the similarity determination section compares the features of the input image data with features of a reference image to determine the input image data is similar to the reference image. Further, the storage section contains the features of the reference image and the processing rule information indicating processing content to be applied to input image data judged to be similar to the reference image, and the control section controls, in accordance with the processing rule information corresponding to the reference image, a process to be performed on the input image data judged to be similar to the reference image.

With this, the process to be performed on the input image data judged to be similar to the reference image can be controlled in accordance with the processing rule information, stored in the information storage device, which corresponds to the reference image. This makes it possible to simplify an operation for a user to set the content of a process to be performed on input image data, and to improve user-friendliness. Further, since the features of the reference image and the processing rule information can be prestored in the information storage device, the required memory capacity of storage means of the image processing apparatus can be reduced in comparison with cases where these pieces of information are stored in the storage means of the image processing apparatus. Further, for example, features of reference images and processing rule information can be stored dispersedly in a plurality of information storage devices. In this case, for example, when stored in each information storage device, features of a reference image and a processing rule can be set according to the needs of a user who owns or uses the information storage device.

An image processing method of the present invention is a method for processing an image in an image processing system including (i) an image processing apparatus which includes an input data obtaining section for obtaining input image data and a control section for controlling content of a process to be performed on the input image data and (ii) an information storage device which includes a storage section for storing features of a reference image, the method including: a features extracting step of extracting features of the input image data; a similarity determination step of comparing the features of the input image data with the features of the reference image to determine whether or not the input image data is similar to the reference image; a processing rule obtaining step in which the image processing apparatus obtains, from the information storage device, processing rule information, stored in the storage section, which indicates processing content to be applied to input image data judged to be similar to the reference image; and a process control step of controlling, in accordance with the processing rule information corresponding to the reference image, a process to be performed on the input image data judged to be similar to the reference image.

According to the foregoing method, the features of the input image data obtained by the input data obtaining section are extracted in the features extracting step, and whether or not the input image data is similar to the reference image is determined in the similarity determination step by comparing the features of the input image data with those features of the reference image which are stored in the storage section of the information storage device. Further, in the processing rule obtaining step, the image processing apparatus obtains from the information storage device the processing rule information, stored in the information storage device, which indicates processing content to be applied to input image data judged to be similar to the reference image. Then, in the process control step, the process to be performed on the input image data judged to be similar to the reference image is controlled in accordance with the processing rule information corresponding to the reference image.

With this, the process to be performed on the input image data judged to be similar to the reference image can be controlled in accordance with the processing rule information, stored in the storage section of the information storage device, which corresponds to the reference image. This makes it possible to simplify an operation for a user to set the content of a process to be performed on input image data, and to improve user-friendliness. Further, since the features of the reference image and the processing rule information can be prestored in the information storage device, the required memory capacity of storage means of the image processing apparatus can be reduced in comparison with cases where these pieces of information are stored in the storage means of the image processing apparatus. Further, for example, features of reference images and processing rule information can be stored dispersedly in a plurality of information storage devices. In this case, for example, when stored in each information storage device, features of a reference image and a processing rule can be set according to the needs of a user who owns or uses the information storage device.

An image forming apparatus of the present invention includes either of the image processing apparatuses described above and an image output section for forming an image on a recording material in accordance with the input image data.

According to the foregoing image forming apparatus, the process to be performed on the input image data judged to be similar to the reference image can be controlled in accordance with the processing rule information, stored in the storage section of the information storage device, which corresponds to the reference image. This makes it possible to simplify an operation for a user to set the content of a process to be performed on input image data, and to improve user-friendliness. Further, since the features of the reference image and the processing rule information can be prestored in the information storage device, the required memory capacity of storage means of the image processing apparatus can be reduced in comparison with cases where these pieces of information are stored in the storage means of the image processing apparatus. Further, for example, features of reference images and processing rule information can be stored dispersedly in a plurality of information storage devices. In this case, for example, when stored in each information storage devices, features of a reference image and a processing rule can be set according to the needs of a user who owns or uses the information storage device.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 11(a) and 11(b) are explanatory diagrams each showing, in the image processing apparatus of FIG. 3, an example of a hash value regarding a feature point stored in a hash table and an index indicative of input image data.

FIG. 16 is an explanatory diagram showing an example of information stored in the external storage device.

DESCRIPTION OF THE EMBODIMENTS

Embodiment 1

An embodiment of the present invention is explained below. Explained in this embodiment is a case where the present invention is applied to a digital color multi-function printer (MFP).

(1-1. Arrangement of a Digital Color Multi-function Printer 1)

Figure 2:
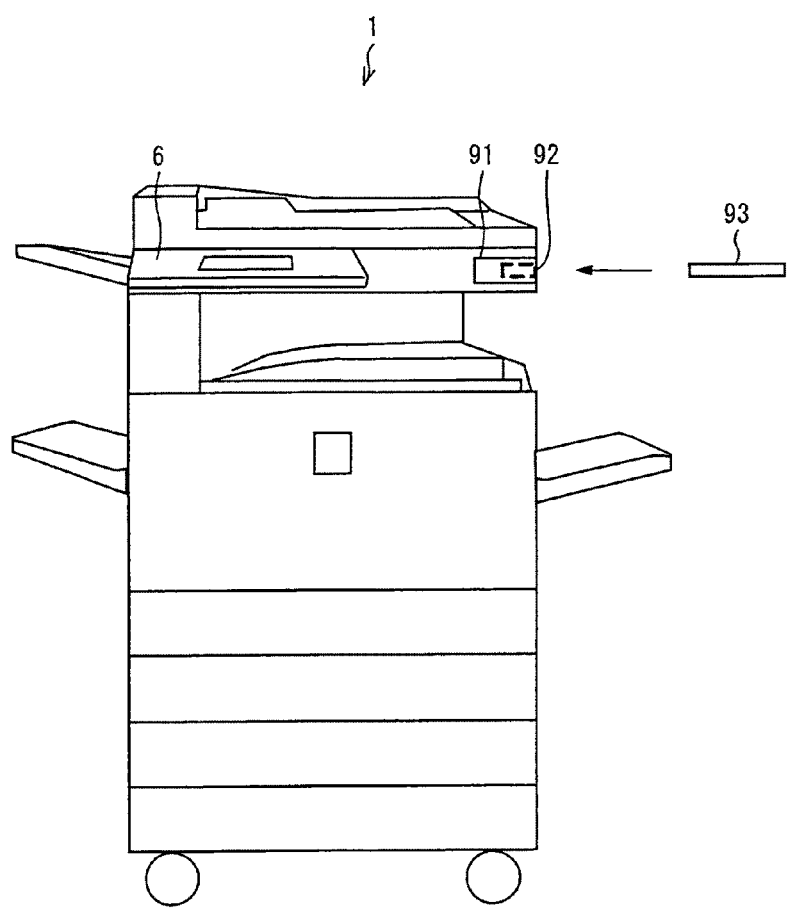
FIG. 2 is a perspective view of an image processing apparatus according to an embodiment of the present invention.
Figure 3:
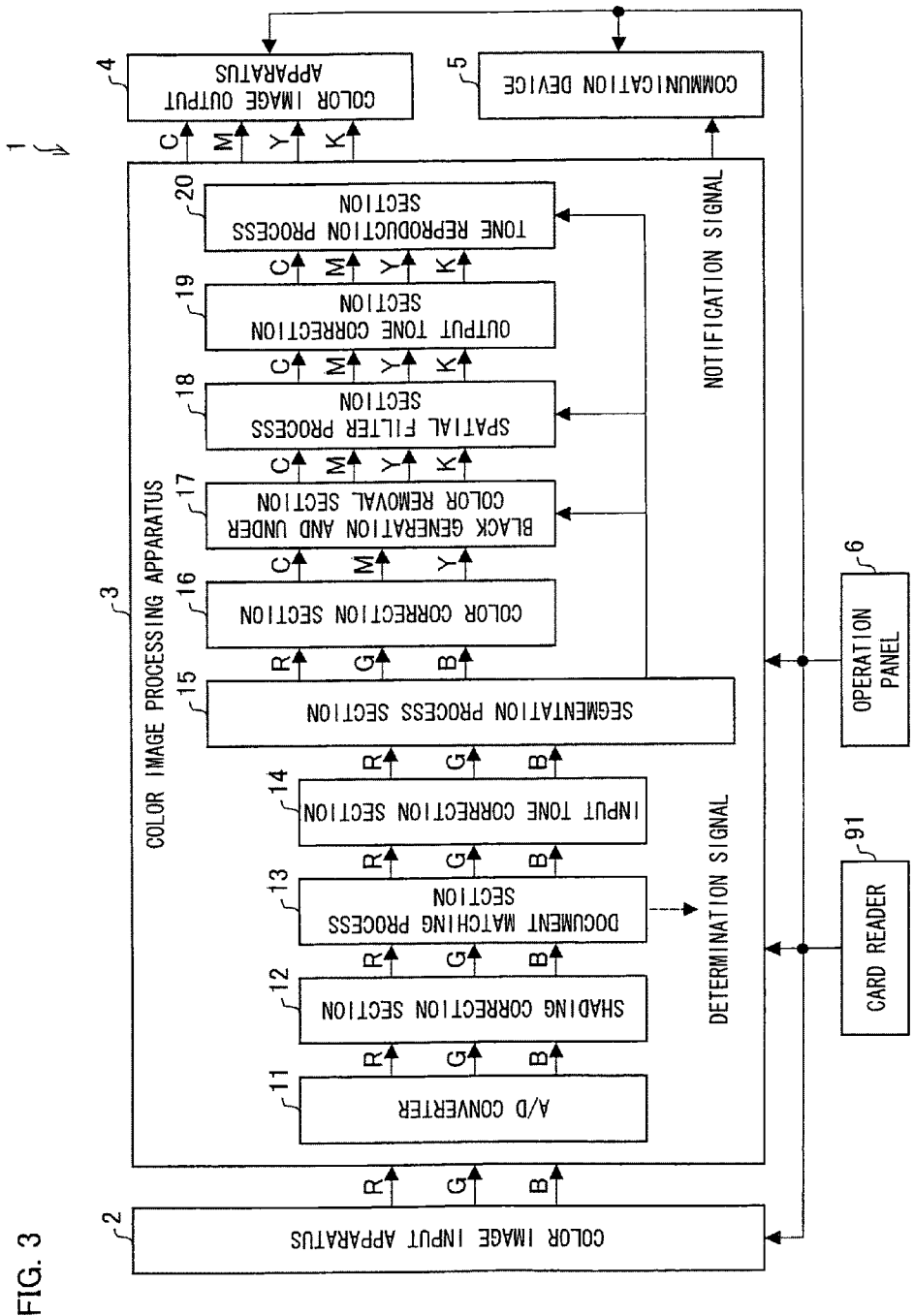
FIG. 3 is a block diagram schematically showing an arrangement of an image processing apparatus according to an embodiment of the present invention.

FIG. 2 is a perspective view of a digital color multi-function printer (image processing apparatus, image forming apparatus, image reading apparatus) 1 according to the present embodiment. FIG. 3 is a block diagram schematically showing an arrangement of the digital color multi-function printer 1. The digital color multi-function printer 1 has a copy function, a print function, a facsimile-transmission function, a scanning function, a scan-to-E-mail function, and the like.

As shown in FIGS. 2 and 3, the digital color multi-function printer 1 includes a color image input apparatus 2, a color image processing apparatus 3, a color image output apparatus 4, a communication device 5, an operation panel 6, a card reader 91, and the like.

The color image input apparatus (image reading apparatus) 2 is, for example, composed of a scanner (not shown) including a CCD (Charge-Coupled Device) for converting optical information into an electric signal. The color image input apparatus 2 reads an optical image reflected from an original document as RGB (R: Red, G: Green, B: Blue) analog signals and supplies the RGB analog signals to the color image processing apparatus 3.

The color image processing apparatus 3 includes an A/D converter 11, a shading correction section 12, a document matching process section 13, an input tone correction section 14, a segmentation process section 15, a color correction section 16, a black generation and under color removal section 17, a spatial filter process section 18, an output tone correction section 19, and a tone reproduction process section 20. The analog signals read by the color image input apparatus 2 are transmitted to the A/D converter 11, the shading correction section 12, the document matching process section 13, the input tone correction section 14, the segmentation process section 15, the color correction section 16, the black generation and under color removal section 17, the spatial filter process section 18, the output tone correction section 19, and the tone reproduction process section 20 in this order in the color image processing apparatus 3. Ultimately, the analog signals are outputted to the color image output apparatus 4 as CMYK digital color signals.

The A/D (Analog/Digital) converter 11 converts the RGB analog signals into RGB digital signals.

The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal such as a density (pixel value) signal that can be processed easily by an image processing system used in the color image processing apparatus 3.

The document matching process section 13 extracts features of input image data. Further, the document matching process section 13 performs a process for determining a similarity between the input image data and a reference image (i.e., a process for determining whether there is any similarity or not; a matching process). Further, in cases where there is a reference image judged to be similar to the input image data, the document matching process section 13 limits, in accordance with a processing rule (common processing rule or an individual processing rule described later), the execution of a process to be performed on the input image data. Further, the document matching process section 13 performs a storage process for storing an index of input image data, features of the input image data, and a processing rule for the input image data so that the index, the features (feature vectors), and the processing rule are associated with one another. Further, the document matching process section 13 outputs the inputted RGB signals to the subsequent input tone correction section 14 without any modification. It should be noted that the document matching process section 13 will be described later in detail.

The input tone correction section 14 removes background color (density component of the background: background density) from the RGB signals whose various distortions have been removed by the shading correction section 12, and adjusts image quality such as contrast.

The segmentation process section 15 separates each pixel of an input image into either one of a text region, a halftone dot region, or a photograph (continuous tone) region, according to the RGB signals. On the basis of a result of the separation, the segmentation process section 15 outputs a segmentation class signal, indicating which region a pixel of the input image belongs to, to the color correction section 16, the black generation and under color removal section 17, the spatial filter process section 18, and the tone reproduction process section 20. The segmentation process section 15 also outputs the input signal as received from the input tone correction section 14 to the subsequent color correction section 16 without any modification.

The color correction section 16 removes color impurity on the basis of spectral characteristics of CMY (C: Cyan, M: Magenta, and Y: Yellow) color materials including an unnecessarily absorption component, in order to realize a faithful color reproduction.

The black generation and under color removal section 17 performs (i) black generation processing for generating a black (K) signal from three color (CMY) signals after the color correction processing and (ii) generation processing of new CMY signals by removing the K signal obtained by the black generation processing from the original CMY signals. As a result, the three CMY signals are converted into four CMYK signals.

With the use of a digital filter, the spatial filter process section 18 performs a spatial filter processing on the basis of a segmentation class signal, with respect to the image data which is received in the form of the CMYK signals from the black generation and under color removal section 17. In the spatial filter processing, the spatial filter process section 18 corrects a spatial frequency characteristic, so as to reduce blur or granularity deterioration in an output image. The tone reproduction process section 20, as with the spatial filter process section 18, performs a predetermined process with respect to the image data in the form of the CMYK signals, on the basis of the segmentation class signal.

For example, in the region separated into a text region by the segmentation process section 15, the spatial filter process section 18 strongly emphasizes a high frequency component in an edge enhancement process of a spatial filter process, in order to improve reproducibility of a black text or a color text especially. Concurrently, the tone reproduction process section 20 selects either binary processing or multi-level dithering on a high-resolution screen suitable for reproducing the high frequency component.

In the region separated into a halftone dot region by the segmentation process section 15, the spatial filter process section 18 performs a low pass filter processing for removing an input halftone dot component. The output tone correction section 19 performs the output tone correction processing in which a signal such as a density signal is converted into a halftone dot area rate that is characteristics of the color image output apparatus 4. Subsequently, the tone reproduction process section 20 performs the tone reproduction processing (half tone generation) so that, ultimately, an image is segmented into pixels and each tone of the pixels can be reproduced. In the region separated into a photograph region by the segmentation process section 15, the binary processing or the multi-level dithering processing is performed on a screen suitable for tone reproduction.

The image data which has been subjected to each of the processing mentioned above is temporarily stored in a storage device (not shown). The image data is read from the storage device at a predetermined timing and supplied to the color image output apparatus 4.

The color image output apparatus 4 outputs the image data supplied from the color image processing apparatus 3 to a recording medium such as paper. The color image output apparatus 4 is not particularly limited and may be a color image output apparatus which uses an electrophotographic method or an ink-jet method.

The communication device 5 is composed of a modem or a network card for example. The communication device 5 communicates with other apparatus connected to a network (e.g., a personal computer, a server, other digital multi-function printer, a facsimile and the like) via a network card, a LAN cable, and the like.

It should be noted that in case of transmitting image data, the communication device 5 carries out a transmission procedure to secure a state where transmission can be performed, and then reads out, from a memory, the image data compressed in a predetermined format (image data scanned by a scanner) and carries out necessary processing such as conversion of the encoding format so as to sequentially transmit the image data via a communication line.

Further, in case of receiving image data, the communication device 5 carries out a communication procedure and receives the image data from an originating communication device so as to input the image data to the color image processing apparatus 3. The received image data is subjected to a predetermined process such as a decoding process, a rotation process, a resolution conversion process, output tone correction, and a tone reproduction process by the color image processing apparatus 3, and the image data thus processed is outputted by the color image output apparatus 4. It should be noted that the present invention may be arranged so that the received image data is stored in a storage device (not shown) and the stored image data is read out by the color image processing apparatus 3 as necessary so as to be subjected to the aforementioned processing.

The operation panel 6 includes, for example, a display section (not shown) such as a liquid crystal display and setting buttons (not shown). The operation panel 6 causes the display section to display information corresponding to an instruction from a main control section (not shown) of the digital color multi-function printer 1 and transmits information, inputted by the user with use of the setting buttons, to the main control section. The user can input, from the operation panel 6, a processing request (e.g., a processing mode (copy, printing, transmission, editing and the like), the number of images to be processed (the number of images to be copied, the number of images to be printed), a destination of input image data, and the like) with respect to the image data. The main control section is composed of a CPU (Central Processing Unit) and the like for example. In accordance with a program or various data stored in a ROM (not shown) or the like and information which is entered from the operation panel 6, the main control section controls each operation of each section of the digital color multi-function printer 1.

As shown in FIG. 2, the card reader 91 includes a card slot 92. Moreover, the card reader 91 reads out information from a card (external storage device) put in the card slot 92 and transmits or writes information to the card 93. The card 93 will be fully described later. Usable examples of the card 93 include an IC card, a memory card, and an optical card. Further, although the present embodiment mainly describes a case where the card 93 is used as the external storage device, the external storage device is not necessarily limited to a card-type storage device. For example, the external storage device may be a tape such as a magnetic tape or a cassette tape, a disk such as a magnetic disc (e.g., a Floppy Disk® or a hard disk) or an optical disc (e.g., a CD-ROM, an MO, an MD, a DVD, or a CD-R), or a semiconductor memory such as a mask ROM, an EPROM, an EEPROM, or a flash ROM. Further, in order to appropriately write and read out information to and from an external storage device to be used, the card reader 91 and the card slot 92 may be appropriately changed to an arrangement for writing and reading out information to and from the external storage device. Further, the external storage device may be a memory provided in a mobile terminal, such as a mobile phone or a PDF, which is connected communicably to the digital color multi-function printer 1 via cable or wirelessly.

Further, the external storage device is not limited to a portable one. The external storage device may be an external device, such as a personal computer or a server, which is connected communicably to the digital color multi-function printer 1 via a network. In this case, the multi-function printer 1 may exclude the card reader 91 and exchange information with the external storage device via the communication device 5.

(1-2 Arrangement of the Document Matching Process Section)

The following fully describes the document matching process section 13. The document matching process section 13 according to the present embodiment extracts a plurality of feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with a plurality of combinations of feature points in the partial set, calculates a hash value by combining the calculated invariants, and votes for a reference image corresponding to the hash value, thereby retrieving a reference image similar to the input image data and carrying out a similarity determination process (whether there is any similarity or not) with respect to the reference image.

Figure 1:
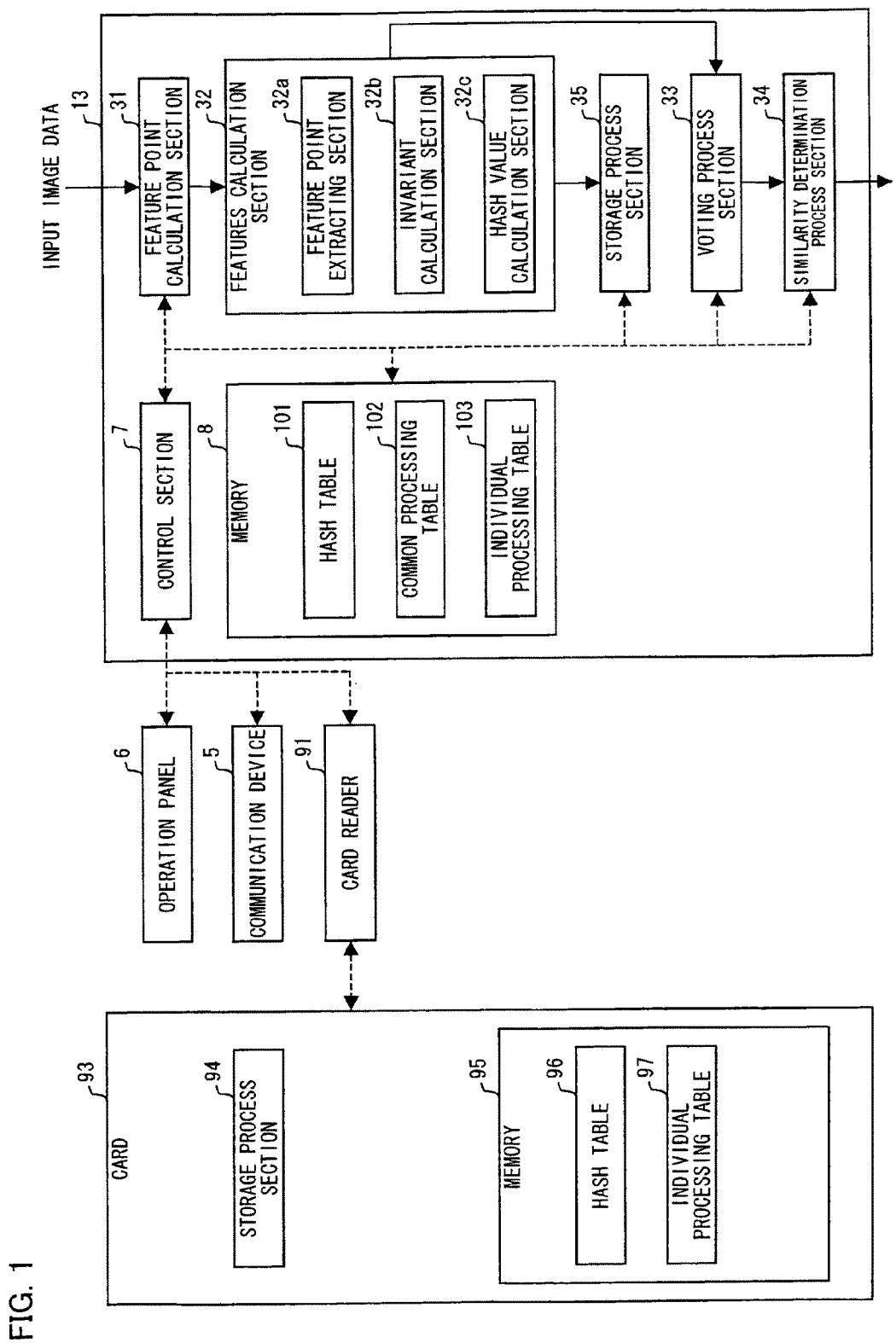
FIG. 1 is a block diagram schematically showing an arrangement of a document matching process section provided in an image processing apparatus according to an embodiment of the present invention and an arrangement of an external storage device connected to the image processing apparatus.

FIG. 1 is a block diagram schematically showing an arrangement of the document matching process section 13 and the card 93. As shown in FIG. 1, the document matching process section 13 includes a feature point calculation section 31, a features calculation section 32, a voting process section 33, a similarity determination process section 34, a storage process section 35, a control section 7, and a memory 8.

The control section 7 controls operation of each of the sections of the document matching process section 13 in accordance with an instruction input inputted from the user via the operation panel 6 or the communication device 5. It should be noted that the control section 7 may be provided in a main control section for controlling operation of each of the sections of the digital color multi-function printer 1 or may be provided separately from the main control section so as to cooperate with the main control section in controlling operation of the document matching process section 13.

Further, in cases where it is determined, as a result of a similarity determination process performed by the document matching process section 13, that there is a similarity (i.e., that input image data is identical with image data of a reference image), the control section 7 performs a process on the input image data in accordance with a processing rule so stored in the memory 8 or a memory 95 of the card 93 as to be associated with the reference image. This process will be fully described later.

In the memory 8, various types of data for use in processes of the sections of the document matching process section 13 and results of the processes etc. are stored. Further, the memory 8 includes a hash table 101, a common processing table 102, and an individual processing table 103.

The hash table 101 is a table (storage section) in which an index of a reference image (identification information for identifying the reference image) and a hash value (features) of the reference image are stored so as to be associated with each other.

The common processing table 102 is a table (storage section) in which an index of a reference image to be stored as a commonly processed image (second reference image) and a common processing rule for the commonly processed image are stored so as to be associated with each other. The term "common processing rule" here means a processing rule which, in cases where input image data is similar to a commonly processed image, applies commonly to the input image data regardless of conditions such as a user who has inputted the input image data, a group to which the user belongs, and a card put in the card reader 91.

The common processing rule is not particularly limited in content. However, applicable examples of the common processing rule include: (i) a processing rule that prohibits the execution of copying, filing, electronic distribution, facsimile transmission, or the like; (ii) a processing rule that permits only a specific user by user authentication to perform a process; (iii) a processing rule by which to output the input image data partially daubed; and (iv) a processing rule by which to output the input image data with a predetermined image (e.g., an image for specifying a user or a multi-function printer or an image indicating that it is restricted (or prohibited) to perform a process on the input image data) added thereto or superimposed thereon. In cases where a predetermined image is added as in the processing rule (iv), it is possible to add an image visible to the user or add an invisible image (e.g., an image that can be confirmed by a predetermined method).

The individual processing table 103 is a table (storage section) in which an index of a reference image read out from the card 93 and stored as an individually processed image (reference image) and an individual processing rule for input image data judged to be similar to the individually processed image are stored so as to be associated with each other. The term "individual processing rule" here means the content of a process to be performed on input image data judged to be similar to an individually processed image. Further, the individual processing rule is stored in the memory 95 of the card 93 so that the user can make an addition or change to the memory content as needed.

The individual processing rule is not particularly limited in content. However, applicable examples of the individual processing rule include: (1) a processing rule by which to transmit the input image data to the mail address of a predetermined destination of electronic distribution; (2) a processing rule by which to store the input image data in a predetermined folder; (3) a processing rule by which to convert the input image data into a predetermined file format (e.g., PDF, JPEG, or TIFF); (4) a processing rule by which to output (e.g., image formation, data transmission, or filing) the input image data with a predetermined resolution, in color or monochrome, and in a predetermined halftone (e.g., 24 bits, 8 bits, or 1 bit); (5) a processing rule by which to subject the input image data to a predetermined halftone process (e.g., simple binarization, dither matrix, or error diffusion); (6) a processing rule by which to compress the input image data at a predetermined compression rate (e.g., JPEG compression); (7) a processing rule by which to perform copying under predetermined processing conditions (e.g., as to selection of a one-side copy from a one-side original, a two-side copy from one-side originals, a two-side copy from a two-side original, or one-side copies from a two-side original, conversion into N in 1 (conversion of N pages of document images into one page of image data), and selection of a predetermined paper size); (8) a processing rule by which to output (e.g., image formation, data transmission, or filing) the input image data by a predetermined number of copies or by one copy at a time; (9) a processing rule by which to fax the input image data to a predetermined destination; (10) a processing rule by which to transmit the read image data via IrDA (infrared communication) or Bluetooth; (11) a processing rule by which to perform an OCR (Optical Character Recognition) process on the input image data; (12) a processing by which to encrypt the input image data; (13) a processing rule by which to perform correction of a tile of the document (skew correction) or correction that puts the document upside down; and (14) a processing rule by which to output (e.g., image formation, data transmission, or filing) the input image data from which a specific color has been deleted (e.g., to output a written ledger sheet (on which the format such as frames and characters has been printed in blue) from which the blue format has been omitted).

As will hereinafter be described in detail, the present embodiment performs a process in accordance with a common processing rule in cases where input image data has been judged to be similar to both a commonly processed image and an individually processed image, i.e., in cases where the similarity of the input image data to the commonly processed image and the similarity of the input image data to the individually processed image are both not less than a threshold value of similarity determination. However, the present embodiment is not limited to this. For example, the present embodiment may perform a process in accordance with a processing rule corresponding to a commonly processed image or an individually processed image having a greater similarity than the other. Further, the present embodiment may perform a process in accordance with an individual processing rule in cases where input image data has been judged to be similar to both a commonly processed image and an individually processed image.

As shown in FIG. 1, the card 93 includes a storage process section 94 and a memory 95.

The memory 95 is a memory in which various types of data (e.g., a card ID, a user ID, an ID of a group to which the user belongs, and various types of control data) related to the card 93 are stored. Further, the memory 95 includes a hash table 96 and an individual processing table 97.

In the hash table 96, an index of a reference image to be stored as an individually processed image and a hash value (features) corresponding to each feature point of the reference image are stored so as to be associated with each other.

In the individual processing table 97, an index of a reference image to be stored as an individually processed image and an individual processing rule for the reference image are stored so as to be associated with each other.

The storage process section 94 writes information to the memory 95 and reads out information from the memory 95. For example, the storage process section 94 receives a hash value and an index of a reference image from the digital color multi-function printer 1, and stores the hash value and the index in the hash table 96 so that the hash value and the index are associated with each other. Further, the storage process section 94 stores an index of a reference image and an individual processing rule for the reference image in the individual processing table 97 so that the index and the individual processing rule are associated with each other. Further, the storage process section 94 appropriately reads out those pieces of information from the memory 95, and sends them to the digital color multi-function printer 1.

The feature point calculation section 31 extracts a connected component of a character string or a ruled line and performs calculation with a centroid of the connected component used as a feature point. However, the arrangement of the feature point calculation section 31 is not limited to this, and the feature point of an image may be calculated in accordance with various conventionally known methods for example.

Figures 4, 5:
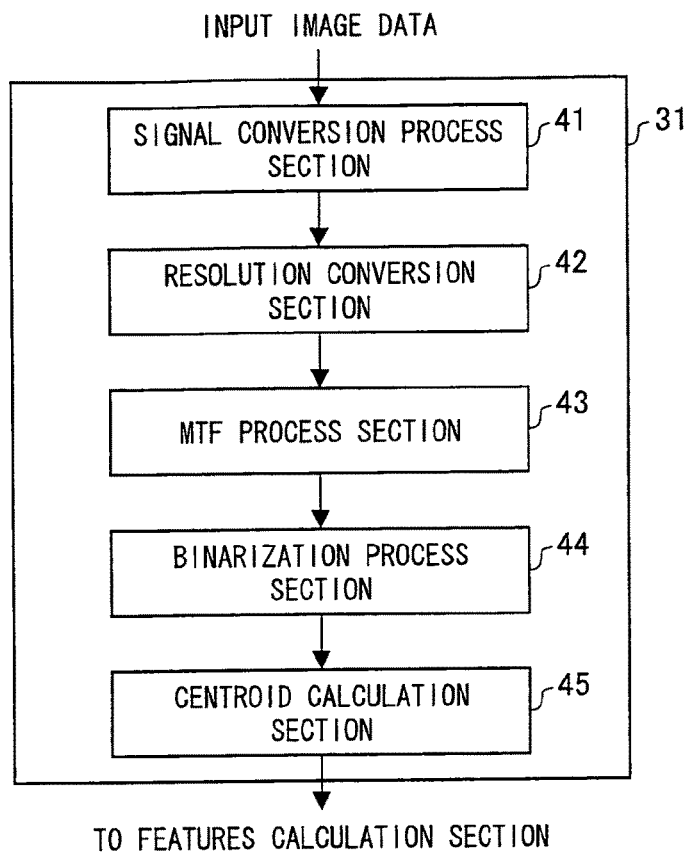
FIG. 4 is a block diagram schematically showing an arrangement of a feature point calculation section provided in the image processing apparatus of FIG. 3.
FIG. 5 is an explanatory diagram showing an example of filter coefficients for a mixing filter provided in an MTF process section of the image processing apparatus of FIG. 3.

FIG. 4 is a block diagram schematically showing an arrangement of the feature point calculation section 31. As shown in FIG. 4, the feature point calculation section 31 includes a signal conversion process section 41, a resolution conversion section 42, an MTF process section 43, a binarization process section 44, and a centroid calculation section 45.

In cases where image data (RGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression (1):

$$Yi = 0.30Ri + 0.59Gi + 0.11Bi \quad (1)$$

where "Y" refers to a luminance signal of each pixel, and each of R, G, and B is a color component of the RGB signals, and "i" subsequently added to "Y", "R", "G", and "B" represents a value given to each pixel ("i" being an integer of not less than 1).

Alternatively, the RGB signals may be converted into CIE1976 L*a*b* signal (CIE: Commission International de l'Eclairage, L*: lightness, a*, b*: chromaticity).

The resolution conversion section 42 scales up/down the input image data. For example, in cases where the input image data is optically scaled up/down by the image input device 2, the resolution conversion section 42 scales up/down the input image data again so as to have a predetermined resolution. Further, in order to reduce processes carried out by the subsequent process sections, the resolution conversion section 42 may convert resolution so as to make the resolution lower than a resolution in being scanned by the image input device 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics among a plurality of color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MFT deterioration causes the scanned image to blur. The MTF process section 43 carries out an appropriate filtering process (emphasizing process) so as to recover the blur caused by the MTF deterioration. Further, the MTF process section 43 is used also to suppress an unnecessary high frequency component in extracting feature points by the subsequent centroid calculation section 45. That is, a mixing filter (not shown) is used to carry out an emphasizing process and a smoothing process. It should be noted that FIG. 5 shows an example of a filter coefficient of the mixing filter.

The binarization process section 44 compares achromatized image data (luminance value (luminance signal) or lightness value (lightness signal)) with a preset threshold value so as to binarize the image data.

Figure 6:
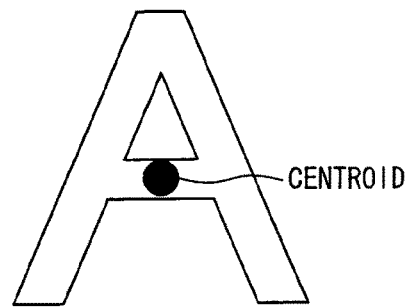
FIG. 6 is an explanatory diagram showing examples of a connected component extracted from input image data by the feature point calculation section of the image processing apparatus of FIG. 3 and a centroid of the connected component.
Figure 7:
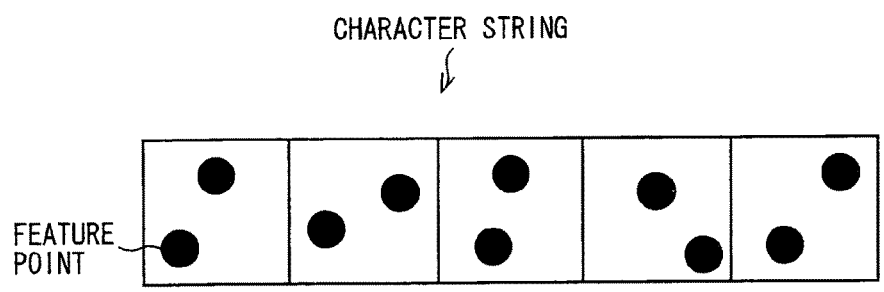
FIG. 7 is an explanatory diagram showing an example of centroids (feature points) of connected components extracted from a character string in input image data by the feature point calculation section of the image processing apparatus of FIG. 3.

The centroid calculation section 45 carries out labeling (labeling process) with respect to each pixel in accordance with the image data binarized by the binarization process section 44 (for example, the binarized data is represented by "1", or "0"). Further, a connected component between pixels having the same label is specified and a centroid of the specified connected component is extracted as a feature point. Further, the extracted feature point is outputted to the features calculation section 32. FIG. 6 is an explanatory diagram showing the connected component extracted from the input image data and a centroid of the connected component as an example. In this figure, the connected component corresponding to a character "A" and the centroid thereof are shown. Further, FIG. 7 is an explanatory diagram showing an example of centroids (feature points) of plural connected components extracted from a character string included in the input image data. It should be noted that the feature point can be expressed by coordinate values (x coordinate, y coordinate) of a binary image.

The features calculation section 32 includes a feature point extraction section 32a, an invariant calculation section 32b, and a hash value calculation section 32c. A feature point calculated by the feature point calculation section 31 is used to calculate features (hash value and/or invariant) that are invariable relative to geometric transformation such as rotation, parallel shift, scaling up, scaling down, and the like of a document image.

Figure 8:
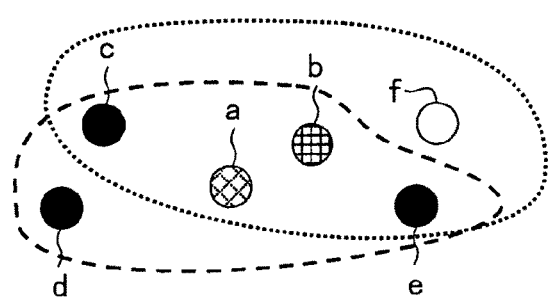
FIG. 8 is an explanatory diagram showing examples of a target feature point and a peripheral feature point that are extracted at a time when the features calculation section of the image processing apparatus of FIG. 3 calculates features.

As shown in FIG. 8, the feature point extraction section 32a regards only one feature point as a target feature point and sequentially extracts peripheral feature points around the target feature point in such order that a feature point nearer to the target feature point is more preferentially extracted so as to extract a predetermined number of feature points (four feature points herein). In FIG. 8, four feature points b, c, d, and e are extracted as peripheral feature points in cases where a feature point a is regarded as a target feature point, and four feature points a, c, e, and f are extracted as peripheral feature points in cases where a feature point b is regarded as a target feature point.

Figure 9:
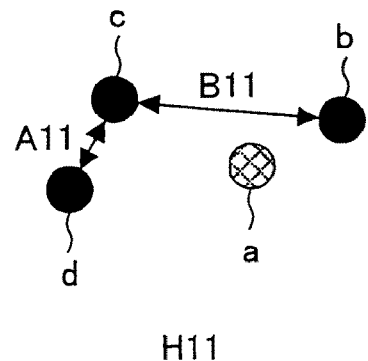
FIGS. 9(a) to 9(c) are explanatory diagrams each showing an example of a combination of a target feature point and a peripheral feature point that are extracted at a time when the features calculation section of the image processing apparatus of FIG. 3 calculates features.
Figure 9:
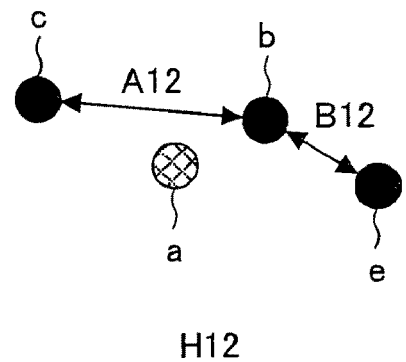
Figure 9:
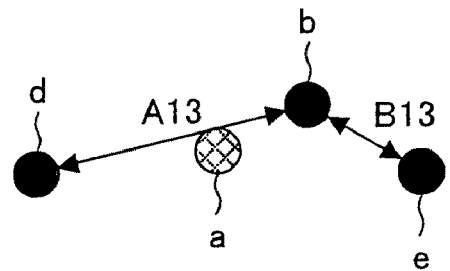

Further, the feature point extraction section 32a extracts a combination of three points that can be selected from the four peripheral feature points extracted in the foregoing manner. For example, as shown in FIGS. 9(a) to 9(c), in cases where the feature point a of FIG. 8 is regarded as a target feature point, combinations of three of the feature points b, c, d, and e, i.e., a combination of peripheral feature points b, c, and d, a combination of peripheral feature points b, c, and e, and a combination of peripheral feature points b, d, and e are extracted.

Next, the invariant calculation section 32b calculates an invariant (one of features) Hij of the extracted combination relative to geometrical transformation. Herein, "i" represents the number of target feature point(s) ("i" being an integer of not less than 1), and "j" represents the number of combinations of three peripheral feature points ("j" being an integer of not less than 1). In the present embodiment, a ratio of lengths of two lines connecting the peripheral feature points is set as the invariant Hij. It should be noted that the lengths of the lines are calculated in accordance with coordinates of the peripheral feature points. For example, in FIG. 9(a), when a length of a line connecting the feature point c and the feature point d is A1 and a length of a line connecting the feature point c and the feature point b is B11, the invariant H11 is such that H11=A11/B11. Further, in FIG. 9(b), when a length of a line connecting the feature point c and the feature point b is A12 and a length of a line connecting the feature point b and the feature point e is B12, the invariant H12 is such that H12=A12/B12. Further, in FIG. 9(c), when a length of a line connecting the feature point d and the feature point b is A13 and a length of a line connecting the feature point b and the feature point e is B13, the invariant H13 is such that H13=A13/B13. In this manner, the invariants H1, H12, and H13 are calculated in the examples shown in FIGS. 9(a) to 9(c).

Next, the hash value calculation section 32c calculates a remainder of $(Hi1 \times 10^2 + Hi2 \times 10^1 + Hi3 \times 10^0)/D$ as a hash value (one of features) Hi and stores the calculated Hi into the memory 8. Note that, D is a constant number that is set beforehand according to a range which is to be set as a remainder value range.

It should be noted that there is no particular limitation to a method for calculating the invariant Hij. For example, a value calculated in accordance with a compound ratio of five points in the vicinity of the target feature point, or a value calculated in accordance with a compound ratio of five points extracted from n points in the vicinity of the target feature point ("n" being such an integer that $n \geq 5$), or a value calculated in accordance with an arrangement of m points extracted from n points in the vicinity of the target feature point ("m" being such an integer that $m < n$ and $m \geq 5$) and a compound ratio of five points extracted from the m points may be set as the invariant Hij relative to the target feature point. It should be noted that the compound ratio is a value calculated from four points in a straight line or from five points on a plane and is known as an invariant relative to projective transformation which is a kind of geometric transformation.

Further, the method for calculating the hash value Hi is not limited to the above method, i.e., the method for calculating a remainder of $(Hi1 \times 10^2 + Hi2 \times 10^1 + Hi3 \times 10^0)/D$ as a hash value, and another hash function may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

Figure 10:
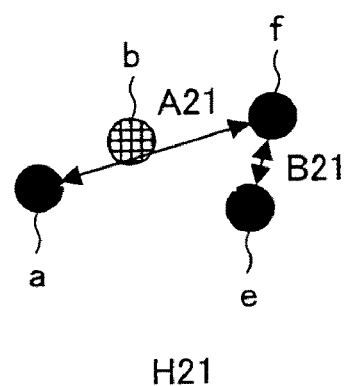
FIGS. 10(a) to 10(c) are explanatory diagrams each showing an example of a combination of a target feature point and a peripheral feature point that are extracted at a time when the features calculation section of the image processing apparatus of FIG. 3 calculates features.
Figure 10:
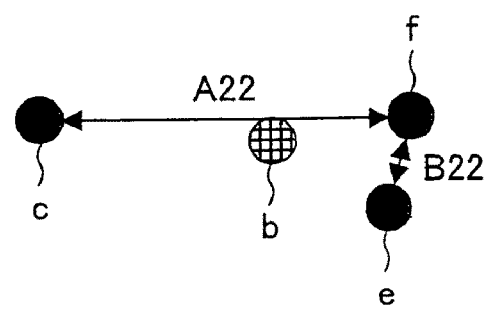
Figure 10:
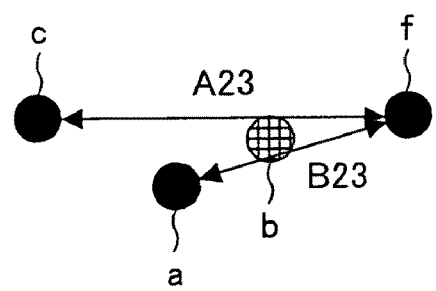

In FIG. 8, when extraction of peripheral feature points around a feature point a regarded as a target feature point and calculation of a hash value are completed, peripheral feature points around a feature point b regarded as a target feature point are extracted and a hash value is calculated. In FIG. 8, four feature points a, c, e, and f are extracted as peripheral feature points in cases where the feature point b is regarded as a target feature point. Further, as shown in FIGS. 10(*a*) to 10(*c*), a combination of three points (peripheral feature points a, e, and f, peripheral feature points c, e, and f, peripheral feature points a, c, and f) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Figure 24:
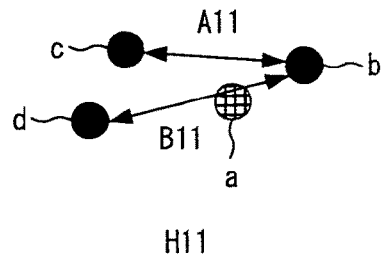
FIGS. 24(a) to 24(d) are explanatory diagrams each showing an example of a combination of a target feature point and a peripheral feature point that are extracted at a time when a features calculation section of an image processing apparatus according to an embodiment of the present invention calculates features.
Figure 24:
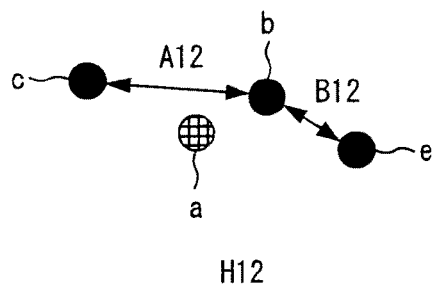
Figure 24:
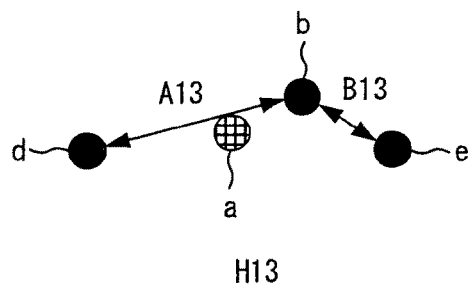
Figure 24:
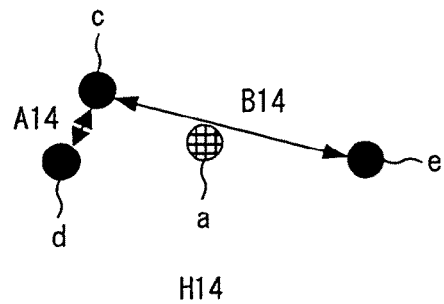

It should be noted that the method for calculating the invariant when the feature point a is regarded as the target feature point is not limited to the aforementioned method. For example, it may be so arranged that: as shown in FIG. 24(*a*) to FIG. 24(*d*), in cases where the feature point a of FIG. 8 is regarded as the target feature point, a combination of three points out of peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted, and an invariant (one of features) Hij relative to geometric transformation is calculated with respect to each of the extracted combinations.

Figure 25:
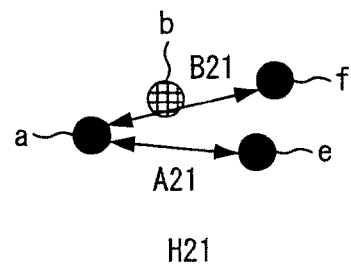
FIGS. 25(a) to 25(d) are explanatory diagrams each showing an example of a combination of a target feature point and a peripheral feature point that are extracted at a time when a features calculation section of an image processing apparatus according to an embodiment of the present invention calculates features.
Figure 25:
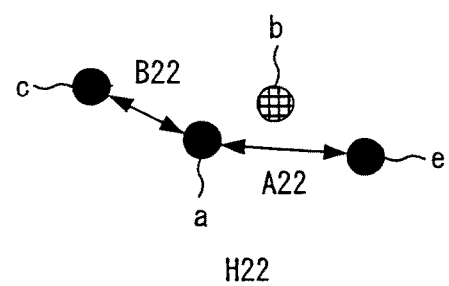
Figure 25:
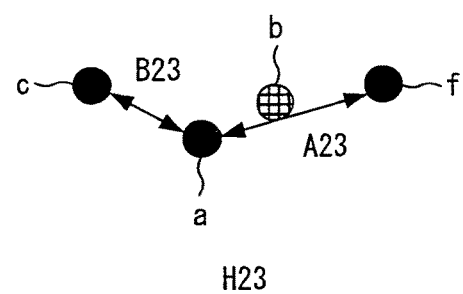
Figure 25:
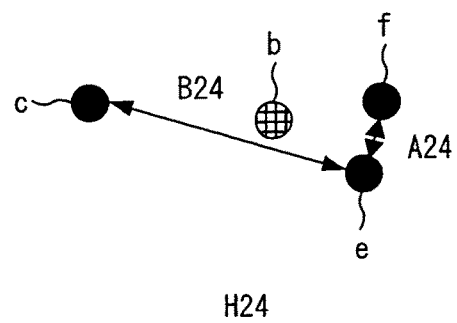

Further, it may be so arranged that: in cases where the feature point b of FIG. 8 is regarded as the target feature point, as shown in FIGS. 25(*a*) to 25(*d*), a combination of three points (peripheral feature points a, e, and f, peripheral feature points a, c, and e, peripheral feature points a, f, and c, peripheral feature points e, f, and c) is extracted from four feature points a, c, e, and f, and an invariant Hij relative to geometric transformation is calculated with respect to each combination. Note that, in this case, a remainder of $(Hi1 \times 10^3 + Hi2 \times 10^2 + Hi3 \times 10^1 + Hi4 \times 10^0)/D$ is calculated as a hash value, and the calculated hash value is stored in the memory 8.

Further, in the aforementioned example, a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, but the definition is not limited to this. The lines used to calculate the invariant Hij may be set in any manner as in such a manner that the lines are set in accordance with a length of each of lines connecting the peripheral feature points.

It should be noted that in case of storing the input image data as a commonly processed image, the features calculation section 32 transmits the hash value (features) calculated in the foregoing manner and corresponding to each feature point of the input image data to the storage process section 35.

The storage process section 35 sequentially stores (i) hash values calculated by the features calculation section 32 and corresponding to the respective feature points and (ii) indices (document IDs) each indicative of a document (reference image) to the hash table 103 provided in the memory 8 (see FIG. 10(*a*)). In cases where the hash values have already been stored, the document IDs are stored with them respectively corresponding to the hash values. Document IDs are serially assigned to respective documents without any duplication. It should be noted that in cases where the number of documents stored in the hash table 103 is larger than a predetermined value (for example, 80% of the number of documents which can be stored), old document IDs may be searched and sequentially deleted. Further, the deleted document IDs may be reused as document IDs of new input image data. Further, in cases where the calculated hash values are identical with each other (H1=H5 in FIG. 11(*b*)), these values may be collectively stored into the hash table 101.

Further, the storage process section stores an index of a reference image to be stored as a commonly processed image and a common processing rule for the reference image in the common processing table 102 so that the index and the common processing rule are associated with each other. The common processing rule is, for example, set by the control section 7 in accordance with an instruction input inputted from the user via the operation panel 6 or the communication device 5.

Further, in case of storing input image data as a commonly processed image, the features calculation section 32 transmits the hash value (features) calculated in the foregoing manner and corresponding to each feature point of the input image data to the card 93 via the card reader 91.

The storage process section 94 of the card 93 sequentially stores, in the hash table 96 provided in the memory 95, (i) hash values received via the card reader 93 and (ii) indices each indicative of a reference image, in such a manner that the hash values and the indices are associated with each other. The same storage method applies here as that applied to the hash table 101. Further, the storage process section 94 stores an index of a reference image and an individual processing rule for the reference image in the individual processing table 97 so that the index and the individual processing rule are associated with each other. The individual processing rule is, for example, set by the control section 7 in accordance with an instruction input inputted from the user via the operation panel 6 or the communication device 5.

Further, in case of determining whether the input image data is identical with image data of an image having been already stored (similarity determination process), the features calculation section 32 transmits, to the voting process section 33, the hash value calculated in the foregoing manner and corresponding to each feature point.

It should be noted that before a voting process, the present embodiment reads out content stored in the hash table 96 of the card 93 and stores it in the hash table 101 of the memory 8, and reads out content stored in the individual processing table 97 of the card 93 and stores it in the individual processing table 103 of the memory 8. It should be noted, for example, that a hash table in which to store the content read out from the hash table 96 of the card 93 may be provided in the memory 8 separately from the hash table 101. Further, when the card 93 is removed from the card reader 93 or when a process performed on input image data is completed, information read out from the card 93 and stored in the memory 8 may be deleted.

Figure 12:
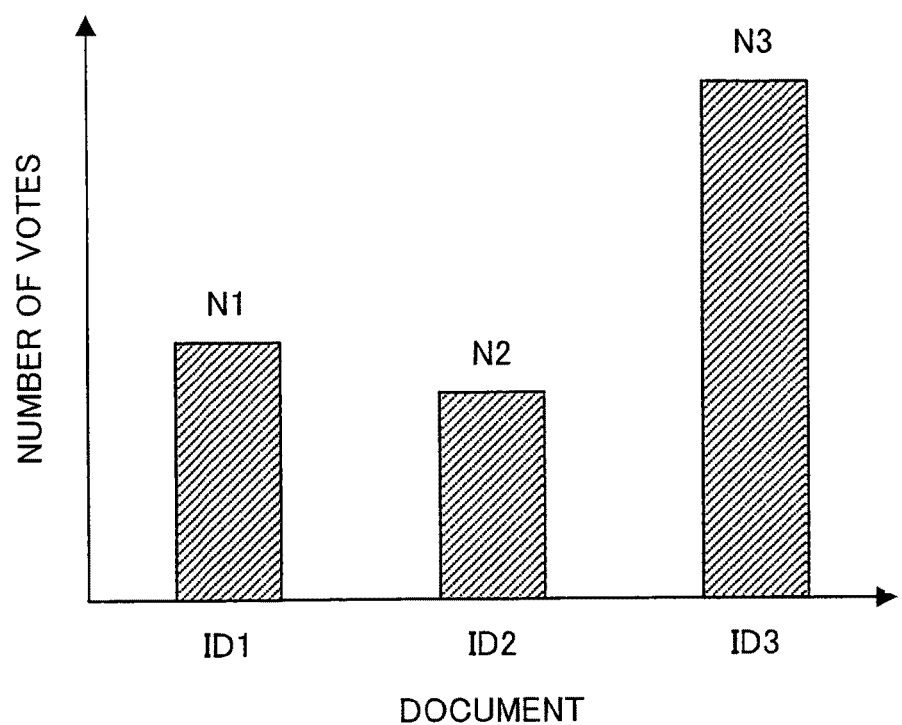
FIG. 12 is a graph showing an example of the number of votes for each reference image in a voting process section of the image processing apparatus of FIG. 3.

The voting process section 33 compares the hash value calculated from the input image data and corresponding to each feature point with the hash value stored in the hash table 101 (hash value of the commonly processed image and the hash value of the individually processed image) so as to vote for a reference image having the same hash value. In other words, there is counted the number of times the same hash value as a hash value of the reference image is calculated from the input image data for each reference image, and the counted number is stored in the memory 8. FIG. 12 is a graph showing an example of the number of votes for reference images ID1, ID2, and ID3.

The similarity determination process section 34 reads out a vote result of the voting process section 33 (an index of each reference image and the number of votes for each reference image: similarity) from the memory 8, and extracts the maximum number of votes obtained and an index of a reference image with the maximum number of votes obtained. Further, the similarity determination process section 34 compares the maximum number of votes obtained with a predetermined threshold value (second threshold value) TH2 to determine whether there is any similarity or not (whether the input image data is identical with image data of the reference image or not), and sends a determination signal indicative of the determination result to the control section 7. That is, in case where the maximum number of votes obtained is not less than the predetermined threshold value TH2, it is determined that "there is similarity (the input image data is identical with image data of the reference image)", and in case where the maximum number of votes is less than the threshold value TH2, it is determined that "there is no similarity (the input image data is not identical with image data of the reference image)".

Alternatively, it may be so arranged that: the similarity determination process section 34 divides the number of votes obtained for each reference image by a total number of votes (total number of feature points extracted from the input image data) and normalizes the result so as to calculate the similarity, thereby comparing the similarity with the predetermined threshold value TH2 (80% of the number of total votes for example) to determine the similarity.

Further, it may be so arranged that: the similarity determination process section 34 divides the number of votes obtained for each reference image by the number of times of storage of a hash value (maximum number of times a hash value is stored) corresponding to a reference image whose hash value is most frequently stored and normalizes the result so as to calculate the similarity, thereby comparing the similarity with the predetermined threshold value TH2 (80% of the number of total votes for example) to determine the similarity. That is, in case where the calculated similarity is not less than a threshold value TH2, it is determined that "there is similarity", and in case where the calculated similarity is less than the threshold value TH2, it is determined that "there is no similarity". Note that, in this case, the total number of hash values extracted from the input image data may be larger than the maximum number of times of storage of a hash value (particularly, a case where the document and/or the reference image partially has a handwritten part), so that the calculated value of the similarity may exceed 100%.

Further, the threshold value TH2 in determining the similarity may be constant for each reference image or may be set for each reference image in accordance with importance or the like of the reference image. As to the importance of the reference image, for example, a paper currency, a valuable stock certificate, a top-secret document, a restricted document, and the like are regarded as having maximum importance, and a secret document is regarded as being less important than a paper current or the like. In this manner, the importance may be set by stages according to each reference image. In this case, a weighting coefficient according to importance of a reference image is stored in the memory 8 with the weighting coefficient corresponding to an index of the reference image, and the similarity determination process section 34 determines the similarity by using the threshold value TH2 corresponding to the reference image with the maximum number of votes obtained.

Further, it may be so arranged that: in determining the similarity, the threshold value TH2 is made constant and the number of votes for each reference image (the number of votes obtained for each reference image) is multiplied by a weighting coefficient of each reference image so that the similarity is determined. In this case, the weighting coefficient according to the importance of each reference image is stored in the memory 8 with the weighting coefficient corresponding to an index of each reference image, and the similarity determination process section 34 calculates a corrected number of obtained votes by multiplying the number of obtained votes of each reference image by the weighting coefficient of the reference image, thereby determining the similarity in accordance with the corrected number of obtained votes. For example, a maximum corrected number of obtained votes may be compared with the threshold value TH2, or a value obtained by normalizing the maximum corrected number of obtained votes by the number of total votes may be compared with the threshold value TH2, or a value obtained by normalizing the maximum corrected number of obtained votes by the maximum number of times of storage may be compared with the threshold value TH2. Further, in this case, for example, the weighting coefficient is set to be more than 1 and to be larger as the importance of the reference image is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

In cases where there is a reference image judged by the similarity determination process section 34 to have a similarity, the control section 7 performs a process on the input image data in accordance with a processing rule (common processing rule or an individual processing rule) so stored as to be associated with the reference image.

(1-3. Processes in the Digital Color Multi-function Printer 1)

Figure 13:
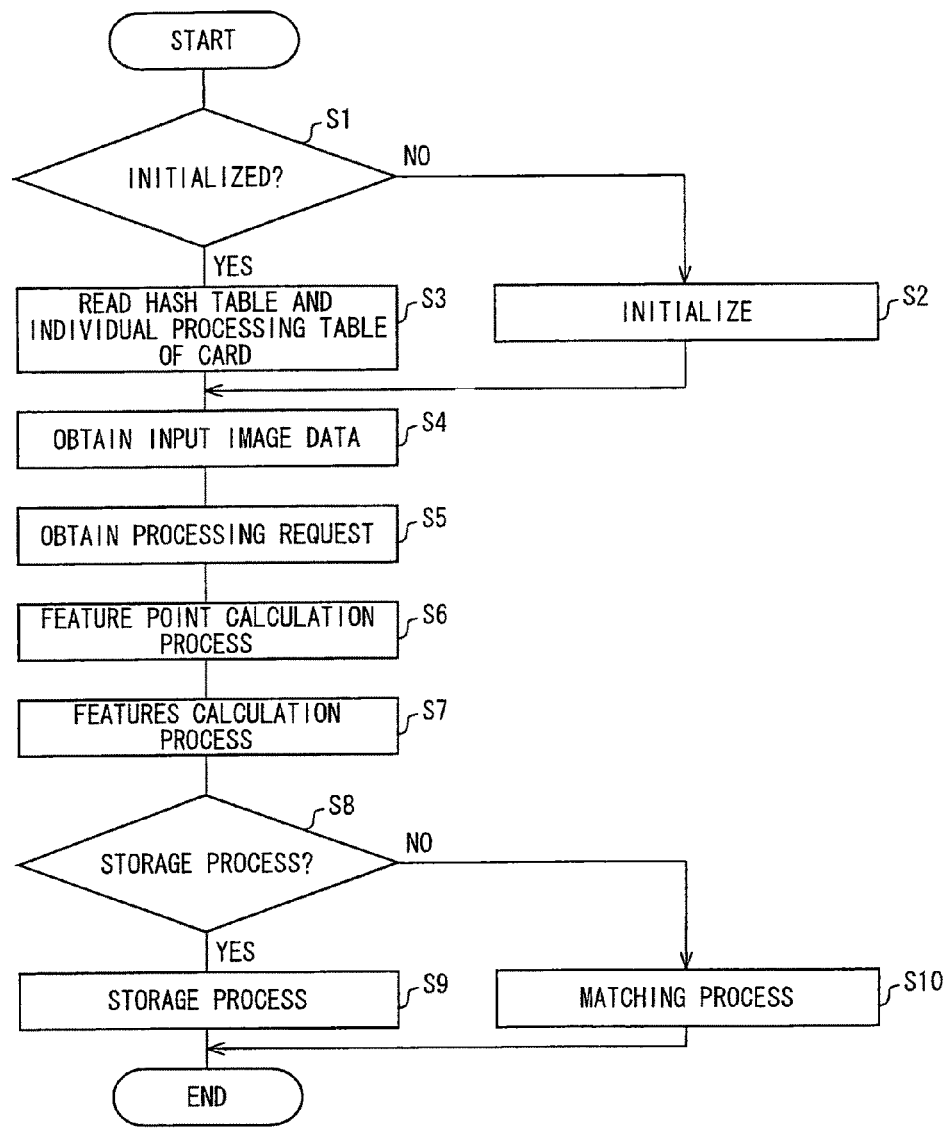
FIG. 13 is a flow chart showing the flow of a process in the image processing apparatus of FIG. 3 and the external storage device.
Figure 14:
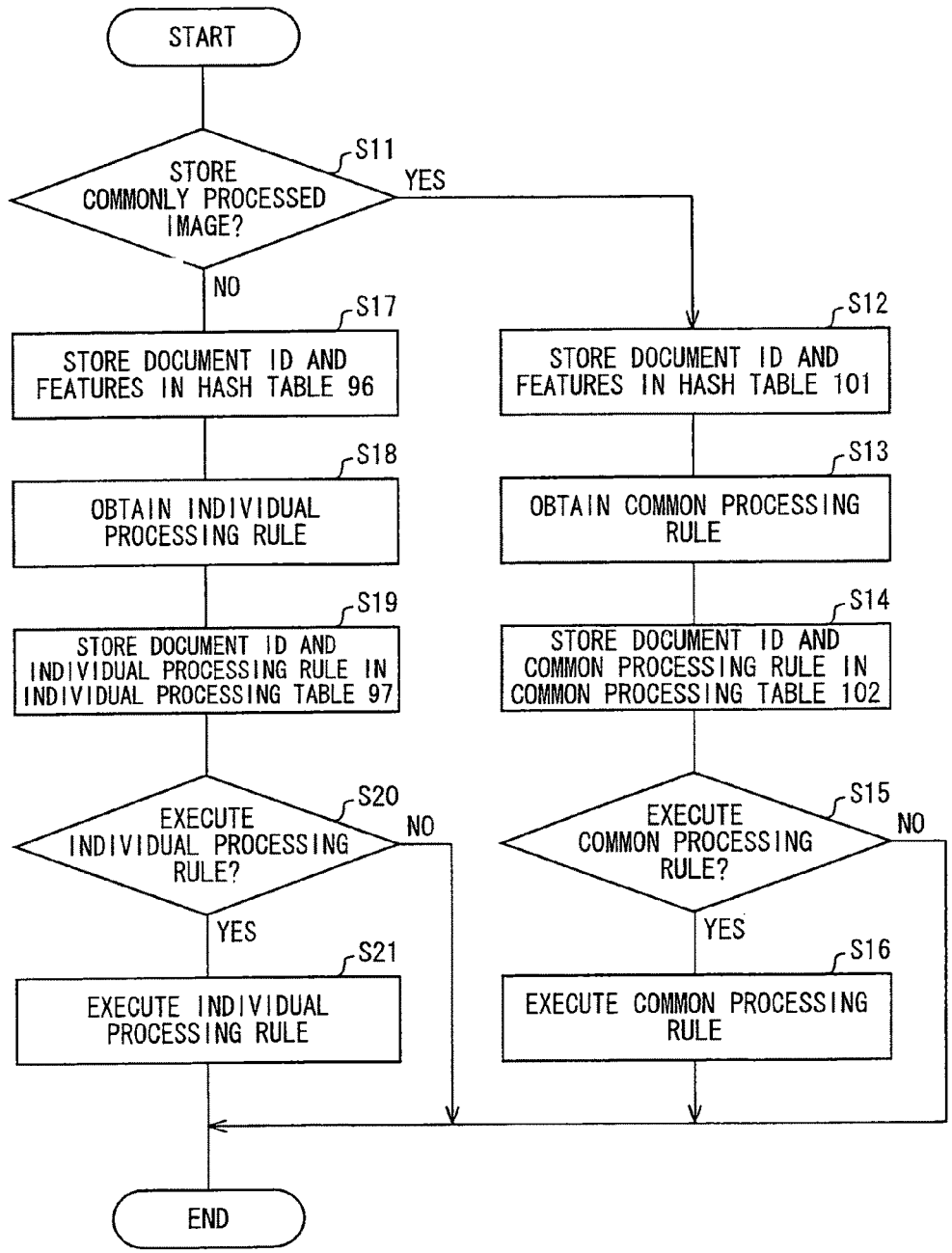
FIG. 14 is a flow chart showing the flow of a storage process in the image processing apparatus of FIG. 3 and the external storage device.
Figure 15:
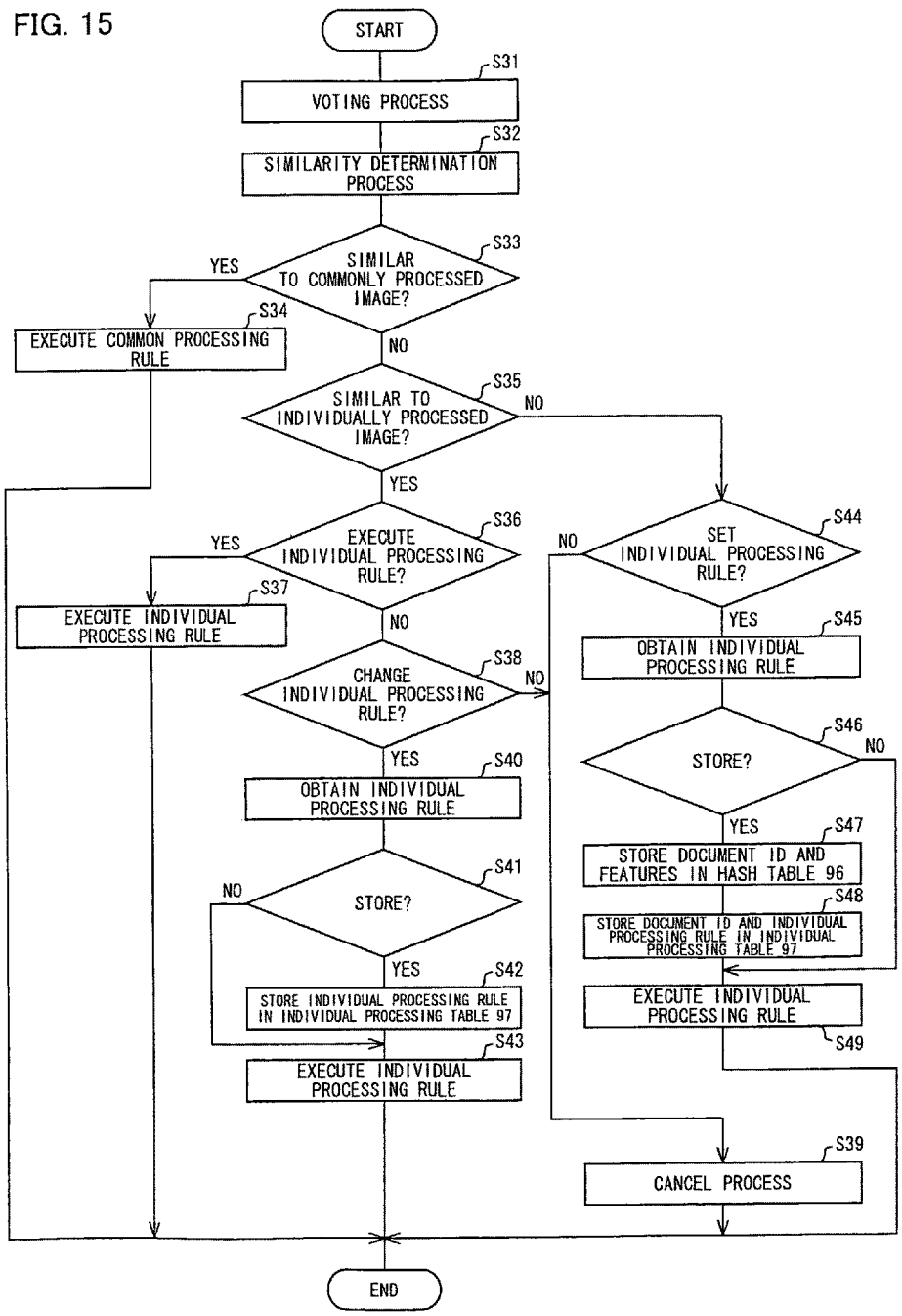
FIG. 15 is a flow chart showing the flow of a similarity determination process in the image processing apparatus of FIG. 3 and the external storage device.

Processes in the digital color multi-function printer 1 will be described below with reference to the flow charts of FIGS. 13 to 15. FIG. 13 is a flow chart showing the flow of a process common to a similarity determination process (matching process) and a storage process. FIG. 14 is a flow chart showing the flow of the storage process. FIG. 15 is a flow chart showing the flow of the similarity determination process (matching process).

When the card 93 is inserted into the card reader 91, the control section 7 determines whether or not the card 93 thus inserted has been initialized (S1). The initialization includes, for example, a process of setting up, in the memory 95, regions in which to store the hash table 96 and the individual processing table 97.

In cases where the control section 7 determines in S1 that the card 93 has not been initialized, the control section 7 initializes the card 93 via the card reader 91 (S2). It should be noted that: the control section 7 may ask the user via the operation panel 6 whether to initialize the card 93, and initialize the card 93 only when the user instructs the control section 7 to initialize the card 93.

On the other hand, in cases where the control section 7 determines in S1 that the card 93 has been initialized, the control section 7 reads information stored in the hash table 96 and the individual processing table 97 of the card 93 (S3). It should be noted that: the control section 7 stores, in the hash table 101, information stored in the hash table 96, and stores, in the individual processing table 103, information stored in the individual processing table 97.

After completion of the step S2 or S3, the control section 7 obtains input image data and a processing request (instruction input) inputted from the user via the operation panel 6 or the communication device 5 (S4, S5). It should be noted that the input image data may be obtained by reading a document image via the color image input apparatus 2, may be obtained from an external device via the communication device 5, or may be read out from various types of storage medium.

Next, the control section 7 controls each of the sections of the document matching process section 13 so that the document matching process section 13 performs a feature point calculation process (S6) and a features calculation process (S7) on the input image data obtained in S4.

Next, the control section 7 determines whether or not the processing request is for a storage process (S8). Then, in cases where the processing request is for a storage process, the storage process of FIG. 14 is performed (S9). In cases where the processing request is not for a storage process, the similarity determination process (matching process) of FIG. 15 is performed (S10).

[In the following, the flow of steps to be taken in performing the storage process will be described with reference to FIG. 14. In cases where the control section 7 determines in S8 of FIG. 13 that the storage process is performed, the control section 7 determines whether or not a commonly processed image is stored (S11). This determination only needs to be made, for example, in accordance with a processing request inputted from the user via the operation panel 6 or the communication device 5.

Then, in cases where the control section 7 determines that a commonly processed image is stored, the control section 7 stores, in the hash table 101, a document ID of the input image data (image to be stored as the commonly processed image) obtained in S4 and features extracted from the input image data, in such a manner that the document ID and the features are associated with each other (S12).

Further, the control section 7 obtains a common processing rule inputted from the user via the operation panel 6 or the communication device 5 (S13). Then, the control section 7 stores, in the common processing table 102 of the memory 8, the document ID of the image to be stored as the commonly processed image and the common processing rule set for the image, in such a manner that the document ID and the common processing rule are associated with each other (S14). Then, the control section 7 determines whether or not to perform a process based on the common processing rule (S15). In cases where the control section 7 determines to perform the process, the control section 7 performs the process based on the common processing rule (S16), and then finishes the operation. In cases where the control section 7 determines in S15 not to perform the process, the control section 7 finishes the operation.

It should be noted that there may be an arrangement in which a commonly processed image and a common processing rule are stored or changed (edited) only by a predetermined specific user (e.g., a security administrator or a similar person in an corporation or a shop). In this case, for example, user information on a user permitted to change and store (edit) a commonly processed image and a common processing rule is prestored in the memory (authentication storage section) 8. Then, when required to store a commonly processed image, the control section (authentication process section) 7 authenticates the user in accordance with the user information, and performs the steps S12 to S16 only in the case of success in user authentication.

On the other hand, in cases where the control section 7 determines in S11 that a commonly processed image is not stored, the control section 7 determines that an individually processed image is stored. Then, the control section 7 stores, in the hash table 96 of the card 93, the document ID of the input image data (image to be stored as the individually processed image) obtained in S4 and features extracted from the input image data, in such a manner that the document ID and the features are associated with each other (S17). Further, the control section 7 stores, in the hash table 101 of the memory 8, the information stored in the hash table 96, thereby updating the hash table 101.

Further, the control section 7 obtains an individual processing rule inputted from the user via the operation panel 6 or the communication device 5 (S18). For example, the control section 7 causes the display section of the operation panel 6 to display selectable processing modes (copy mode, filing mode, electronic distribution mode, and other modes), and allows the user to select a desired processing mode. Further, in cases where the user selects the copy mode, the control section 7 accepts instruction inputs from the user with regard to the type of recording material to be used (paper feed tray to be used), the number of copies to be made, the necessity of image processing such as scaling up, scaling down, rotation, parallel shift, or the like, and a tray onto which the recording material is ejected after copying. Further, in cases where the user selects the electronic distribution mode, the control section 7 accepts the mail address of a destination from the user. Further, in cases where the user selects the filing mode, the control section 7 causes the display section of the operation panel 6 to display, for example in a tree structure, the location of a folder in which to store the image data, and accepts, from the user, an instruction to select the folder (to set a path). In this case, the folder in which to store the image data may be located in a memory such as a hard disk provided in the digital color multi-function printer 1, or may be located in a memory provided in an external device such as a server connected communicably to the digital color multi-function printer 1.

Then, the control section 7 stores, in the individual processing table 97 of the card 93, the document ID of the input image data (image to be stored as the individually processed image) obtained in S4 and an individual processing rule set for the input image data, in such a manner that the document ID and the individual processing rule are associated with each other (S19).

Further, the control section 7 stores, in the individual processing table 103 of the memory 8, the information stored in the individual processing table 97, thereby updating the individual processing table 103. FIG. 16 is an explanatory diagram showing an example of information, stored in the individual processing table 97, which is to be stored in the individual processing table 103, and shows examples of processing rules by which to perform electronic distribution and filing, respectively. As shown in FIG. 16, in cases where electronic distribution is performed, the fact that the processing mode is an electronic distribution mode and the address of a destination are recorded as an individual processing rule so as to be associated with a document ID. Further, in cases where filing is performed, the fact that the processing mode is a mode in which to file image data and the path to a folder in which to save the image data are recorded as an individual processing rule so as to be associated with a document ID.

Then, in accordance with an instruction inputted from the user via the operation panel 6 or the communication device 5, the control section 7 determines whether or not to perform a process based on the individual processing rule obtained in S18 (S20). In cases where the control section 7 determines to perform the process, the control section 7 performs the process (S21), and then finishes the operation. In cases where the control section 7 determines not to perform the process, the control section 7 finishes the operation.

In the following, the flow of steps to be taken in performing the similarity determination process (matching process) will be described with reference to FIG. 15. In cases where the control section 7 determines in the step S8 that the processing request is not for a storage process, the control section 7 performs the similarity determination process. In this case, the control section 7 controls the voting process section 33 so that the voting process section 33 performs a voting process in accordance with the features calculated in S7 by the features calculation section 32 (S31). Further, the control section 7 controls the similarity determination process section 34 so that the similarity determination process section 34 performs the similarity determination process in accordance with the voting process performed by the voting process section 33 (S32).

The control section 7 determines, in accordance with a result of the similarity determination process, whether or not the input image data obtained in S4 is similar to a commonly processed image (S33). Then, in cases where the control section 7 determines that the input image data is similar to a commonly processed image, the control section 7 performs a process in accordance with a common processing rule, stored in the common processing table 102, which corresponds to the common processed image (S34), and then finishes the operation.

On the other hand, in cases where the control section determines in S33 that the input image data obtained in S4 is not similar to a commonly processed image, the control section 7 determines whether or not the input image data is similar to an individually processed image (S35).

Then, in cases where the control section 7 determines that the input image data is similar to an individually processed image, the control section 7 determines whether or not to perform a process on the input image data in accordance with an individual processing rule, stored in the individual processing table 103, which corresponds to the individually processed image (S36). For example, the control section 7 causes the display section of the operation panel 6 or a display section of a communicably connected external device to display an individual processing rule corresponding to a reference image judged to be similar, and asks the user whether or not to perform a process based on the individual processing rule. Then, when the user gives an instruction to perform the process, the control section 7 determines to perform the process based on the individual processing rule. Then, in cases where the control section 7 determines to perform the process based on the individual processing rule, the control section 7 causes the process to be performed (S37), and then finishes the operation.

On the other hand, in cases where the control section 7 determines in S36 not to perform a process based on the individual processing rule, the control section 7 determines whether or not to perform a process after changing the individual processing rule stored in the individual processing table 103 (S38). This determination is made, for example, in accordance with an instruction from the user via the operation panel 6 or the communication device 5. Then, in cases where the control section 7 determines not to perform a process after changing the individual processing rule, the control section 7 cancels the process (S39), and then finishes the operation.

On the other hand, in cases where the control section 7 determines in S38 to change the individual processing rule, the control section 7 obtains information relevant to changes in the individual processing rule from the user via the operation panel 6 or the communication device 5 (S40). Then, the control section 7 determines, in accordance with an instruction inputted from the user via the operation panel 6 or the communication device 5, whether or not to store the changes thus obtained, i.e., whether or not to change the individual processing rule corresponding to the reference image (reference image judged to be similar) stored in the individual processing table 97 of the card 93 (S41).

Then, in cases where the control section 7 determines to store the changes thus obtained, the control section 7 stores, in the individual processing table 97, a document ID of the reference image (reference image judged to be similar) and the individual processing rule thus changed, in such a manner that the document ID and the individual processing rule are associated with each other (S42). That is, the control section 7 changes the individual processing rule, stored in the individual processing table 97, which corresponds to the reference image. Further, the control section 7 stores, in the individual processing table 103 of the memory 8, the information stored in the individual processing table 97, thereby updating the individual processing table 103.

It should be noted that in cases where the control section 7 determines to not to store the changes thus obtained, the control section 7 temporarily stores, in the individual processing table 103, the document ID of the reference image (reference image judged to be similar) and the individual processing rule thus changed, in such a manner that the document ID and the individual processing rule are associated with each other. The purpose of this is to perform a process in accordance with the individual processing rule in a subsequent step S43.

Then, after the step S41 or S42, the control section 7 performs a process in accordance with the individual processing rule thus changed and stored in the individual processing table 97 (S43), and then finishes the operation.

On the other hand, in cases where the control section 7 determines in S35 that the input image data is not similar to an individually processed image, i.e., in cases where the control section 7 determines that the input image data is similar to neither a commonly processed image not an individually processed image, the control section 7 determines whether or not to set an individual processing rule for the input image data (S44). This determination is made in accordance with an instruction inputted from the user via the operation panel 6 or the communication device 5. Then, in cases where the control section 7 determines not to set an individual processing rule, the control section 7 cancels the process for the input image data (S39), and then finishes the operation.

On the other hand, in cases where the control section 7 determines in S44 to set an individual processing rule, the control section 7 obtains an individual processing rule inputted from the user via the operation panel 6 or the communication device 5 (S45). Then, the control section 7 determines, in accordance with an instruction input from the user, whether or not to store the individual processing rule thus obtained (S46). Then, in cases where the control section 7 determines to store the individual processing rule, the control section 7 sends, to the card 93, the document ID of the input image data (image to be stored as the individually processed image) obtained in S4 and the features extracted from the input image data, and then stores the document ID and the features in the hash table 96 of the card 93 so that the document ID and the features are associated with each other (S47). Further, the control section 7 sends, to the card 93, the document ID of the input image data obtained in S4 and the individual processing rule obtained in S45, and then stores the document ID and the individual processing rule in the individual processing table 97 of the card 93 so that the document ID and the individual processing rule are associated with each other (S48). Further, the control section 7 stores, in the individual processing table 103 of the memory 8, the information stored in the individual processing table 97, thereby updating the individual processing table 103.

Then, in cases where the control section 7 determines in S46 not to store the individual processing rule, the control section 7 temporarily stores, in the individual processing table 103, the document ID of the reference image (image judged to be similar) and the individual processing rule thus changed, in such a manner that the document ID and the individual processing rule are associated with each other. After that or after the step S48, the control section 7 causes a process to be performed based the individual processing rule obtained in S45 and stored in the individual processing table 103 (S49), and then finishes the operation.

In the present embodiment thus described, the memory 95 of the card 93 is provided with the hash table 96 in which a document ID of a reference image (individually processed image) and features of the reference image are stored so as to be associated with each other. Further, the memory 95 of the card 93 is provided with the individual processing table 97 in which a document ID of a reference image (individually processed image) and an individual processing rule set for the reference image are stored so as to be associated with each other. Moreover, in cases where it is determined that input image data is similar to a reference image stored in the hash table 96 of the card 93, the input image data is processed in accordance with an individual processing rule corresponding to the reference image.

This makes it possible to store reference images dispersedly in a plurality of cards 93, and therefore makes it possible to prevent a shortage of memory capacity of the digital color multi-function printer 1 even in the case of an increase in the number of reference images to be used in the digital color multi-function printer 1. Further, this allows the user to optionally store a reference image, features of the reference image, and a processing rule set for input image data similar to the reference image in his/her own card 93, and therefore enables simplification of the operation of setting the content of a process for the input image data. That is, this makes it unnecessary for the user to perform an operation of inputting detailed setting items one by one every time he/she performs a process on input image data, and therefore enables improvements in user-friendliness.

Further, in the present embodiment, the memory 8 of the digital color multi-function printer 1 is provided with the hash table 101 in which a document ID of a reference image to be stored as a commonly processed image and features of the reference image are stored so as to be associated with each other. Further, the memory 8 is provided with the common processing table 102 in which a document ID of a commonly processed image and a common processing rule set for the commonly processed image are stored so as to be associated with each other. Moreover, in cases where it is determined that input image data is similar to a commonly processed image, the input image data is processed in accordance with a common processing rule corresponding to the commonly processed image.

By thus storing, in the memory 8 of the digital color multi-function printer 1, a document ID of a reference image to be stored as a commonly processed image, features of the reference image, and a common processing rule set for the reference image, input image data judged to be similar to the commonly processed image can be surely processed in accordance with the common processing rule regardless of an inserted card or information stored in the card.

It should be noted that: the present embodiment assumes that information is read out from the hash table 96 and the individual processing table 97 of the card 93 and temporarily stored in the memory 8 of the digital color multi-function printer 1 before a similarity determination process is performed, and that the similarity determination process is performed on a commonly processed image and an individually processed image in the digital color multi-function printer 1; however, the present embodiment is not limited to this. For example, the similarity determination process may be performed on a commonly processed image and an individually processed image in the card 93.

Figure 17:
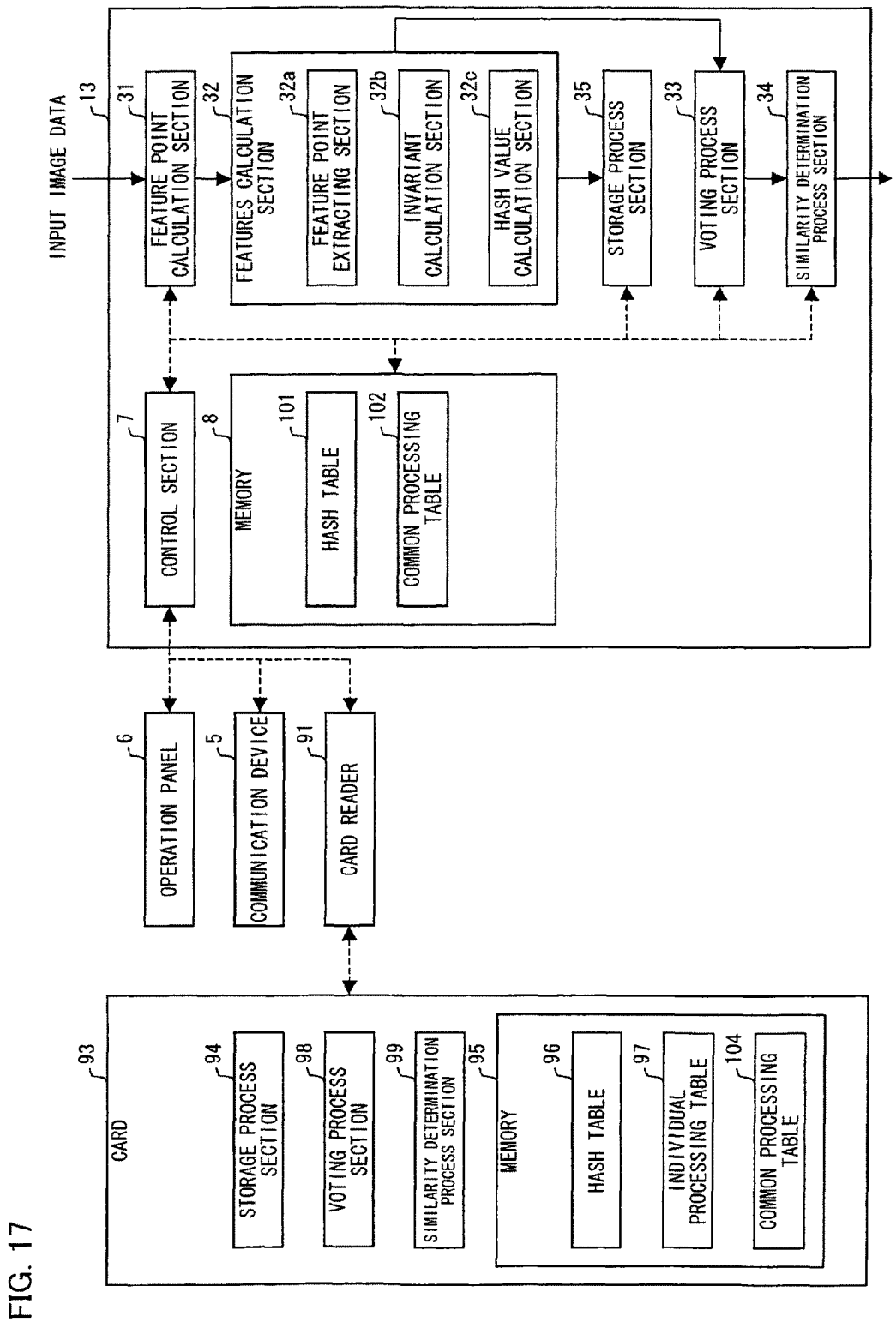
FIG. 17 is a block diagram showing a modified example of a document matching process section provided in an image processing apparatus according to an embodiment of the present invention and a modified example of an external storage device connected to the image processing apparatus.

FIG. 17 is a block diagram, showing an example arrangement of the document matching process section 13 of the digital color multi-function printer 1 and an example arrangement of the card 93, which assumes a case where a similarity determination process is performed on a commonly processed image and an individually processed image in the card 93.

In the example shown in FIG. 17, the card 93 includes a voting process section 98 and a similarity determination process section 99 in addition to the arrangement of FIG. 1. Functions and arrangements of the voting process section 98 and the similarity determination process section 99 are substantially the same as those of the voting process section 33 and the similarity determination process section 34 of the document matching process section 13 of FIG. 1. Further, in the example shown in FIG. 17, the individual processing table 103 is omitted from the memory 8 of the document matching process section 13 arranged as shown in FIG. 1.

Figure 18:
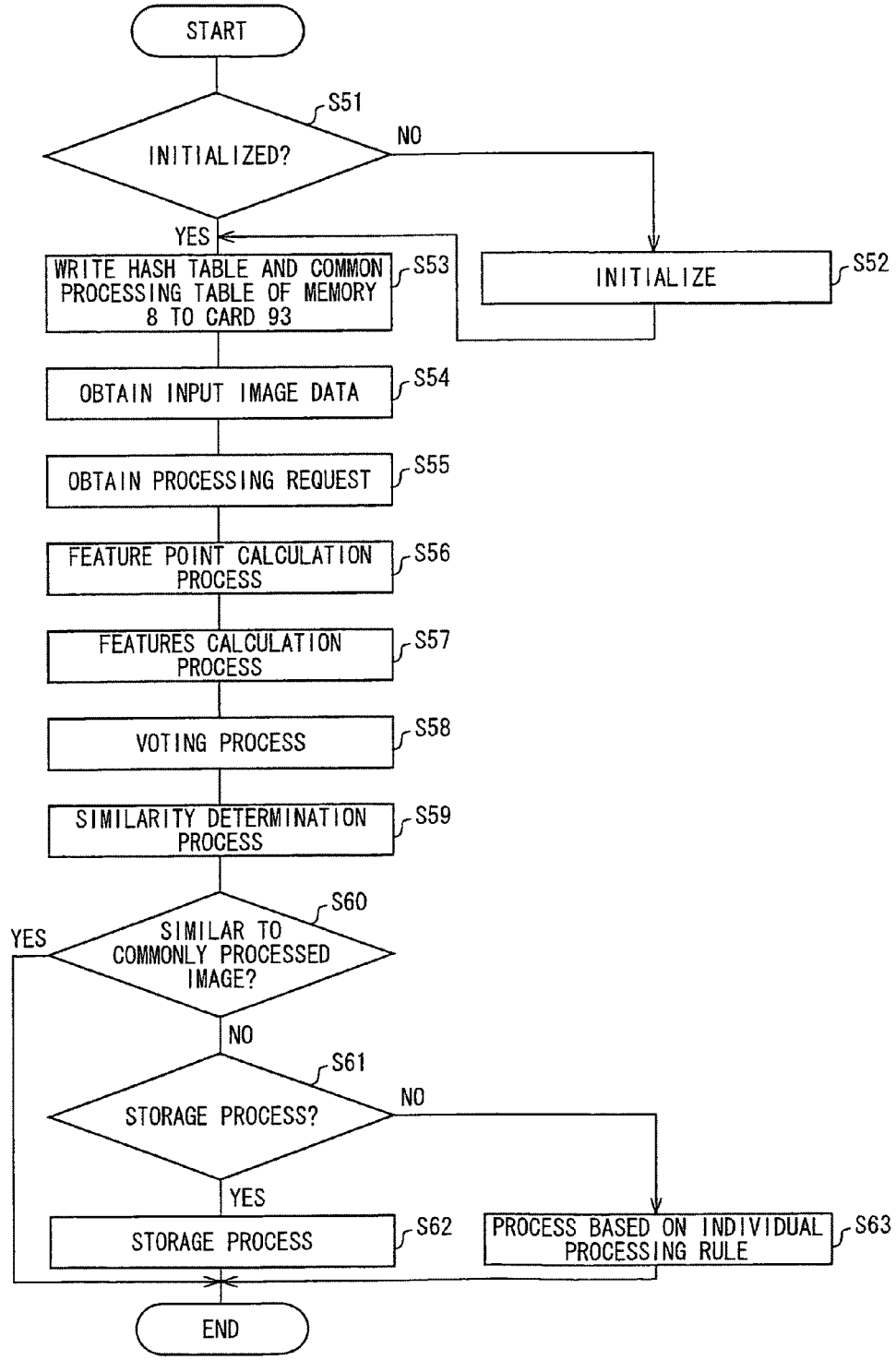
FIG. 18 is a flow chart showing the flow of a process in the image processing apparatus of FIG. 17 and the external storage device of FIG. 17.
Figure 19:
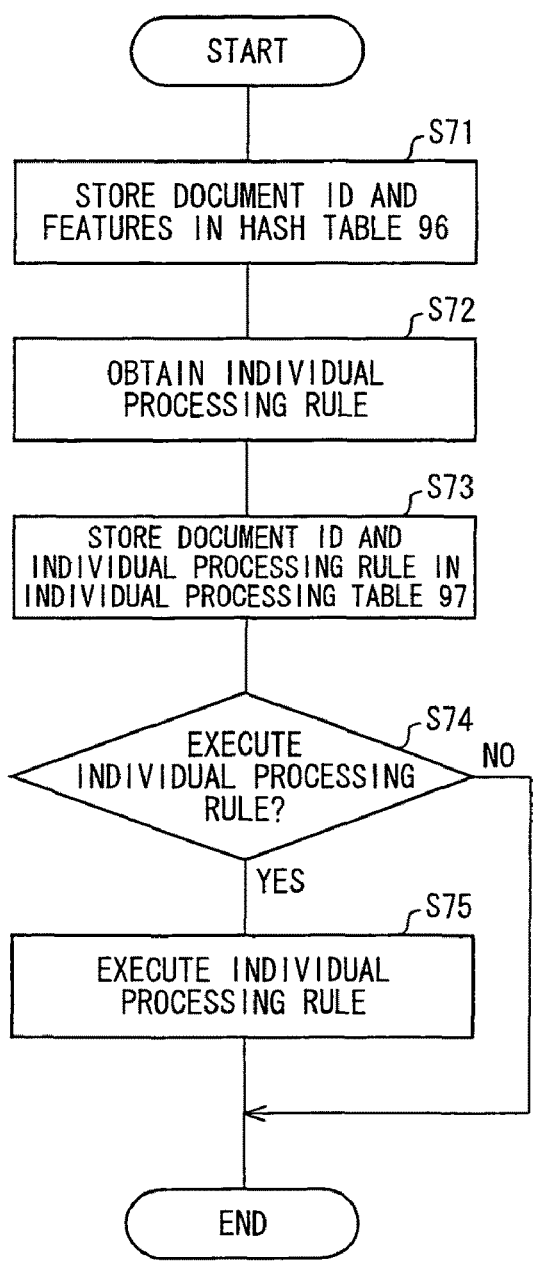
FIG. 19 is a flow chart showing the flow of a storage process in the image processing apparatus of FIG. 17 and the external storage device of FIG. 17.
Figure 20:
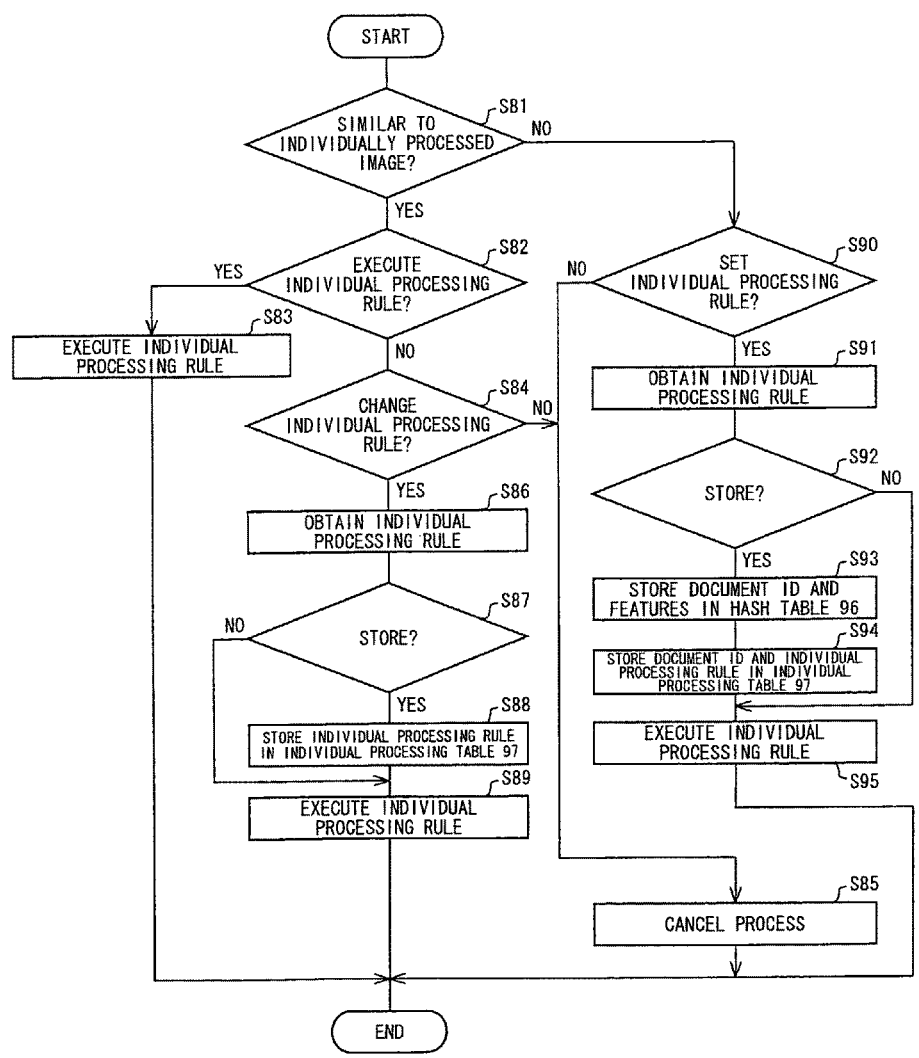
FIG. 20 is a flow chart showing the flow of a process to be performed in accordance with an individual processing rule in the image processing apparatus of FIG. 17 and the external storage device of FIG. 17.

FIG. 18 is a flow chart showing the flow of a process in the arrangement of FIG. 17. FIG. 19 is a flow char showing the flow of steps to be taken in performing a storage process in the arrangement of FIG. 17. FIG. 20 is a flow chart showing the flow of steps to be taken in performing a process in accordance with an individual processing rule in the arrangement of FIG. 17. It should be noted that such a commonly processing rule has been set in the examples of FIGS. 18 to 20 as to prohibit the execution of a process on input image data judged to be similar to a commonly processed image.

As shown in FIG. 18, when the card 93 is inserted into the card reader 91, the control section 7 determines whether or not the card 93 thus inserted has been initialized (S51). The initialization includes, for example, a process of setting up, in the memory 95, regions in which to store the hash table 96, the individual processing table 97, and a common processing table 104.

In cases where the control section 7 determines in S51 that the card 93 has not been initialized, the control section 7 initializes the card 93 via the card reader 91 (S52). It should be noted that: the control section 7 may ask the user via the operation panel 6 whether to initialize the card 93, and initialize the card 93 only when the user instructs the control section 7 to initialize the card 93.

On the other hand, in cases where the control section 7 determines in S51 that the card 93 has been initialized, or after the control section 7 initializes the card 93 in S52, the control section 7 reads out information from the hash table 101 and the common processing table 102 of the memory 8, and writes the read information to the hash table 96 and the common processing table 101 of the card 93 (S53). It should be noted that: the control section 7 stores, in the hash table 96 of the card 93, the information stored in the hash table 101, and stores, in the individual processing table 104 of the card 93, the information stored in the individual processing table 102.

Next, the control section 7 obtains input image data and a processing request (instruction input) inputted from the user via the operation panel 6 or the communication device 5 (S54, S55).

Next, the control section 7 controls each of the sections of the document matching process section 13 so that the document matching process section 13 performs a feature point calculation process (S56) and a features calculation process (S57) on the input image data obtained in S4. Then, the control section 7 sends, to the card 93, the features calculated in S57.

Next, the control section 7 controls the voting process section 98 and the similarity determination section 99 of the card 93 so that the voting process section 98 and the similarity determination section 99 perform a voting process and a similarity process, respectively, in accordance with the features calculated in S57 (S58, S59). It should be noted that the voting process section 98 and the similarity determination section 99 may be controlled by a control section (not shown) provided in the card 93.

Next, the control section 7 determines whether or not the input image data has been judged to be similar to a commonly processed image (S60). Then, in cases where the control section 7 determines that the input image data is similar to a commonly processed image, the control section 7 finishes the process without performing a process on the input image data.

On the other hand, in cases where the control section 7 determines in S60 that the input image data is not similar to a commonly processed image, the control section 7 determines whether or not the processing request is for a storage process (S61). Then, in cases where the processing request is for a storage process, the storage process of FIG. 19 is performed (S62). In cases where the processing request is not for a storage process, the process, shown FIG. 20, which corresponds to an individual processing rule is performed (S63).

In the following, the flow of steps to be taken in performing the storage process will be described with reference to FIG. 19. In cases where the control section 7 determines in S61 of FIG. 18 that the storage process is performed, the control section 7 stores, in the hash table 96 of the card 93, a document ID of the input image data (image to be stored as an individually processed image) obtained in S54 and features extracted from the input image data, in such a manner that the document ID and the features are associated with each other (S71). Further, the control section 7 obtains an individual processing rule inputted from the user via the operation panel 6 or the communication device 5 (S72).

Then, the control section 7 stores, in the individual processing table 97 of the card 93, the document ID of the input image data (image to be stored as an individually processed image) obtained in S54 and an individual processing rule set for the input image data, in such a manner that the document ID and the individual processing rule are associated with each other (S73).

Then, in accordance with an instruction inputted from the user via the operation panel 6 or the communication device 5, the control section 7 determines whether or not to perform a process based on the individual processing rule obtained in S72 (S74). In cases where the control section 7 determines to perform the process, the control section 7 performs the process (S75), and then finishes the operation. In cases where the control section 7 determines not to perform the process, the control section 7 finishes the operation.

In the following, the flow of steps to be taken in performing a process based on an individual processing rule will be described with reference to FIG. 20. In cases where the control section 7 determines in the step S61 of FIG. 18 that the processing request is not for a storage process, the control section 7 determines whether or not the input image data is similar to an individually processed image (S81).

Then, in cases where the control section 7 determines that the input image data is similar to an individually processed image, the control section 7 determines whether or not to perform a process on the input image data in accordance with an individual processing rule corresponding to the reference image (S82). For example, the control section 7 causes the display section of the operation panel 6 or a display section of a communicably connected external device to display an individual processing rule corresponding to a reference image judged to be similar, and asks the user whether or not to perform a process based on the individual processing rule. Then, when the user gives an instruction to perform the process, the control section 7 determines to perform the process based on the individual processing rule. Then, in cases where the control section 7 determines to perform the process based on the individual processing rule, the control section 7 causes the process to be performed (S83), and then finishes the operation.

On the other hand, in cases where the control section 7 determines in S82 not to perform a process based on the individual processing rule, the control section 7 determines whether or not to perform a process after changing the individual processing rule stored (S84). This determination is made, for example, in accordance with an instruction from the user via the operation panel 6 or the communication device 5. Then, in cases where the control section 7 determines not to perform a process after changing the individual processing rule, the control section 7 cancels the process (S85), and then finishes the operation.

On the other hand, in cases where the control section 7 determines in S84 to change the individual processing rule, the control section 7 obtains information relevant to changes in the individual processing rule from the user via the operation panel 6 or the communication device 5 (S86). Then, the control section 7 determines, in accordance with an instruction inputted from the user via the operation panel 6 or the communication device 5, whether or not to store the changes thus obtained, i.e., whether or not to change the individual processing rules corresponding to the reference image (reference image judged to be similar) stored in the individual processing table 97 of the card 93 (S87).

Then, in cases where the control section 7 determines to store the changes thus obtained, the control section 7 stores, in the individual processing table 97, a document ID of the reference image (reference image judged to be similar) and the individual processing rule thus changed, in such a manner that the document ID and the individual processing rule are associated with each other (S88). That is, the control section 7 updates the individual processing rule, stored in the individual processing table 97, which corresponds to the reference image.

Then, after the step S87 or S88, the control section 7 performs a process in accordance with the individual processing rule thus changed (S89), and then finishes the operation.

On the other hand, in cases where the control section 7 determines in S81 that the input image data is not similar to an individually processed image, i.e., in cases where the control section 7 determines that the input image data is similar to neither a commonly processed image not an individually processed image, the control section 7 determines whether or not to set an individual processing rule for the input image data (S91). This determination is made in accordance with an instruction inputted from the user via the operation panel 6 or the communication device 5. Then, in cases where the control section 7 determines not to set an individual processing rule, the control section 7 cancels the process for the input image data (S85), and then finishes the operation.

In cases where the control section 7 determines in S90 to set an individual processing rule, the control section 7 obtains an individual processing rule inputted from the user via the operation panel 6 or the communication device 5 (S91). Then, the control section 7 determines, in accordance with an instruction input from the user, whether or not to store the individual processing rule thus obtained (S92). Then, in cases where the control section 7 determines to store the individual processing rule, the control section 7 sends, to the card 93, the document ID of the input image data (image to be stored as the individually processed image) obtained in S54 and the features extracted from the input image data, and then stores the document ID and the features in the hash table 96 of the card 93 so that the document ID and the features are associated with each other (S93). Further, the control section 7 sends, to the card 93, the document ID of the input image data obtained in S54 and the individual processing rule obtained in S91, and then stores the document ID and the individual processing rule in the individual processing table 97 of the card 93 so that the document ID and the individual processing rule are associated with each other (S94).

After the control section 7 determines in S92 not to store the individual processing rule or after the step S94, the control section 7 causes a process to be performed based the individual processing rule obtained in S91 (S95), and then finishes the operation.

It should be noted that the arrangement of FIG. 17 may be arranged such that: in cases where a card 93 including a voting process section 98 and a similarity determination process section 99 is inserted, a similarity determination process is performed in the card 93; and in cases where a card including neither a voting process section 98 nor a similarity determination process section 99 is inserted, a similarity determination process is performed in the voting process section 33 and the similarity determination process section 34 of the document matching process section 13.

Further, the arrangement of FIG. 17 may be arranged so as to perform a similarity determination process on a commonly processed image in the digital color multi-function printer 1, and to perform a similarity determination process on an individually processed image in the card 93.

Figure 21:
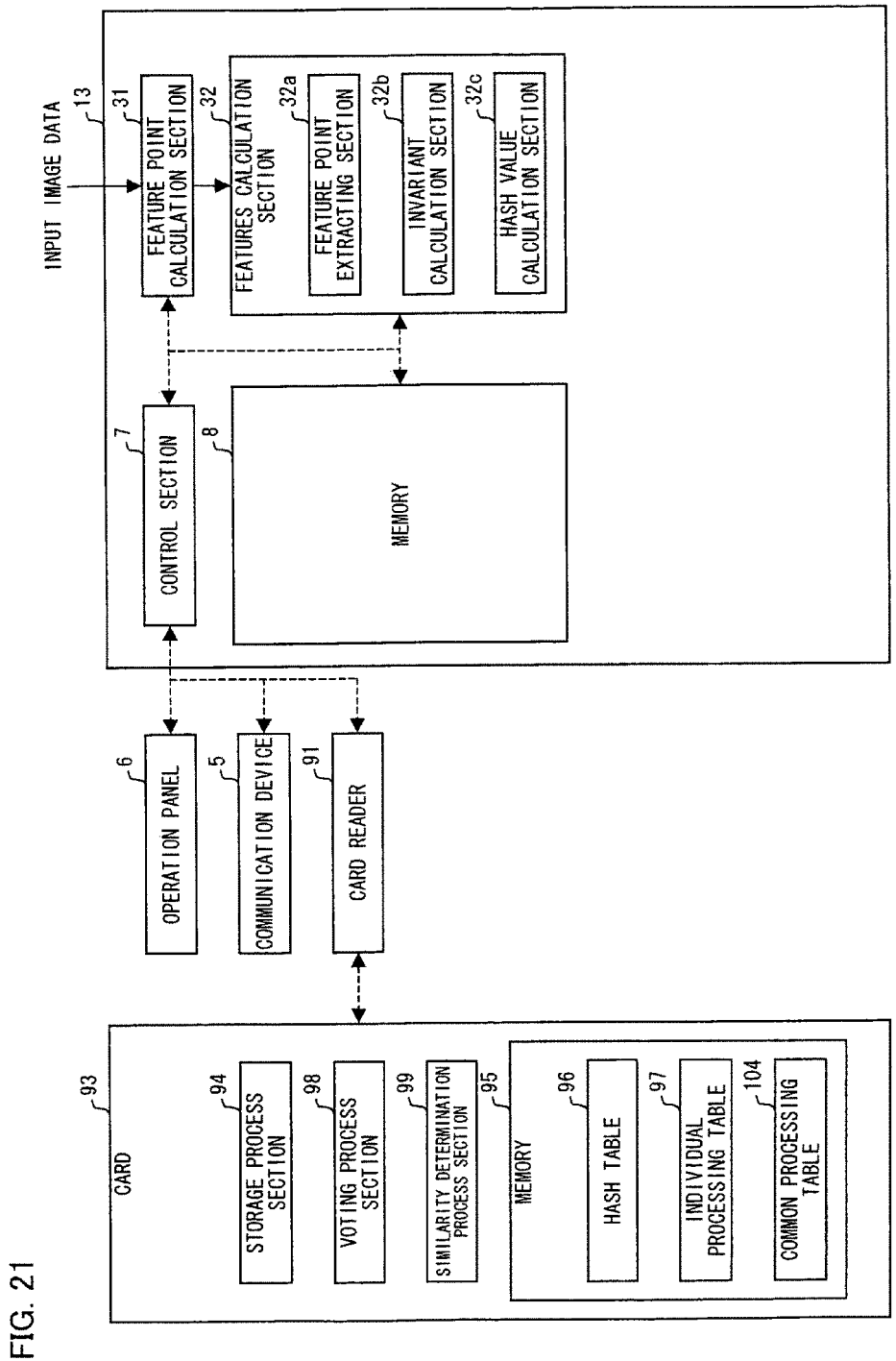
FIG. 21 is a block diagram showing another modified example of a document matching process section included in an image processing apparatus according to an embodiment of the present invention and another modified example of an external storage device connected to the image processing apparatus.

Further, although the present embodiment assumes that a commonly processed image and a commonly processing rule are stored in the hash table 101 and the common processing table 102 of the memory 8, the present embodiment is not limited to this. For example, it is also possible to store a commonly processed image and a commonly processing rule in the hash table 96 and the common processing table 104 of the card 93. In this case, as shown in FIG. 21, it is possible to omit the voting process section 33, the similarity determination process section 34, the storage process section 35, the hash table 101, and the common processing table 102 from the document matching process section 13 of FIG. 17.

Further, in cases where a commonly processed image and a commonly processing rule are stored in the hash table 96 and the common processing table 104 of the card 93, there may be an arrangement in which only a predetermined specific user (e.g., a security administrator or a similar person in an corporation or a shop) is allowed to store a commonly processed image and a commonly processing rule and to change the content of these pieces of information thus stored. In this case, for example, it is possible to write, to the memory 95 of the card 93, information that specifies a holder of the card 93 (e.g., a user ID, a personal identification number, or a password), to authenticate a user in accordance with the information in a user authentication section (not shown) provided in the digital color multi-function printer 1 or the card 93, and to permit only a successfully authenticated user to store a commonly processed image and a commonly processing rule and to change the content of these pieces of information thus stored. Similarly, it is also possible to permit only a successfully authenticated user to store and change an individual processing rule.

Further, although the present embodiment assumes that a commonly processed image and an individually processed image are both stored, the present embodiment is not limited to this. For example, there may be an arrangement in which to store only an individually processed image without storing a commonly processed image.

Further, although the present embodiment has described cases where the present invention is applied to the digital color multi-function printer 1, the present invention can be applied to other apparatuses. For example, the present invention may be applied to a monochrome multi-function printer. Further, the present invention may be applied not only to a multi-function printer, but also to a separate facsimile communication apparatus, a copier, an image reading apparatus, and the like.

Figure 22:
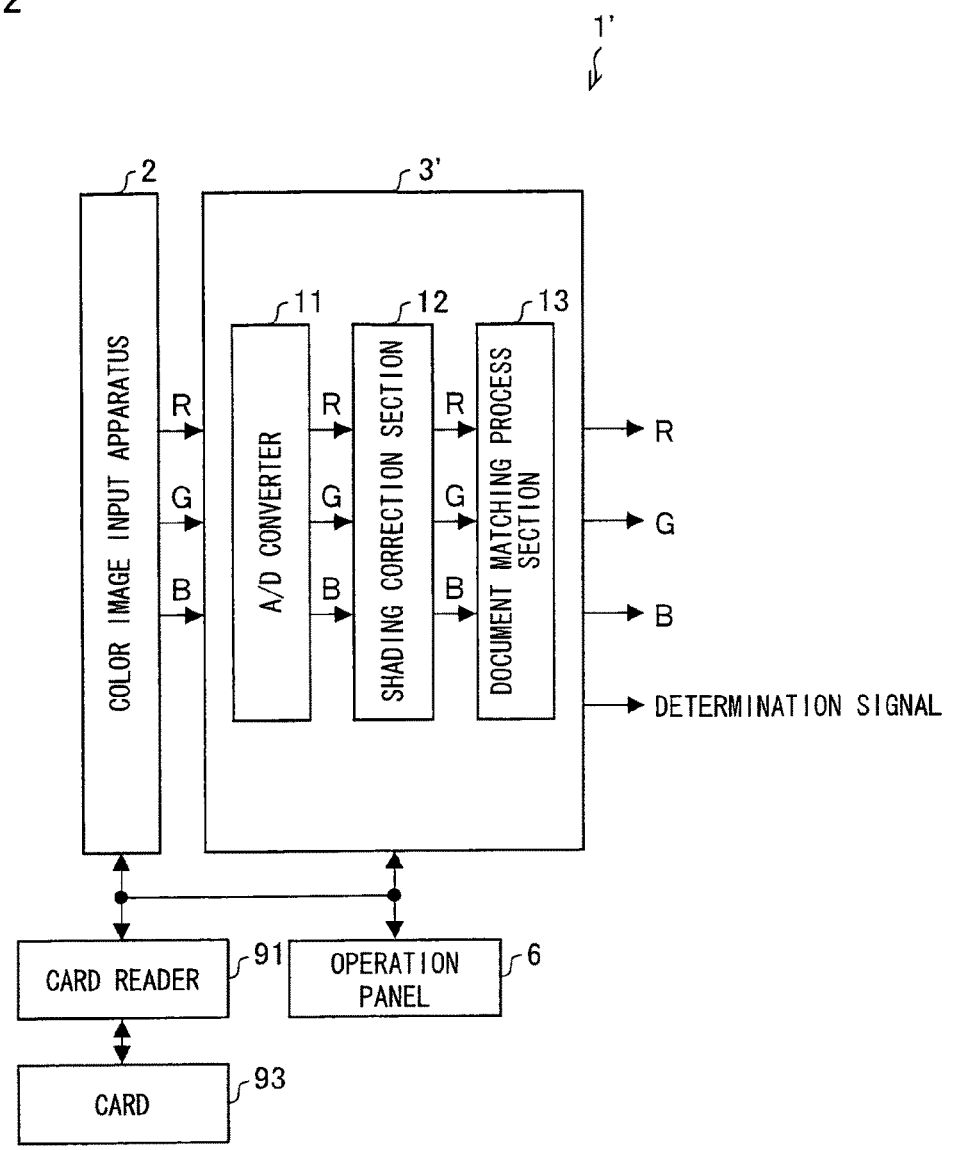
FIG. 22 is a block diagram showing a modified example of an image processing apparatus according to an embodiment of the present invention.

FIG. 22 is a block diagram showing an example arrangement in which the present invention is applied to a flat bed scanner (image reading apparatus, image processing apparatus) 1'.

As shown in FIG. 22, the flat bed scanner 1' includes a color image input apparatus 2, a color image processing apparatus 3', an operation panel 6, and a card reader 91. The color image processing apparatus 3' includes an A/D conversion section 11, a shading correction section 12, and a document matching process section 13. The color image input apparatus 2 is connected to the color image processing apparatus 3', and the color image input apparatus 2 and the color image processing apparatus 3' constitute the image reading apparatus 1' as a whole. Functions of the A/D conversion section 11, the shading correction section 12, the document matching process section 13, and the card reader 91 each provided in the color image input apparatus 2 (image reading means) are substantially the same as those of the members of the aforementioned digital color multi-function printer 1 and the aforementioned card reader 91, and therefore will not be described here.

Further, as described above, the external storage device may be an external device, such as a personal computer or a server, which is connected communicably to the digital color multi-function printer 1 via a network. In this case, the multi-function printer 1 may exclude the card reader 91 and exchange information with the external storage device via the communication device 5.

Figure 23:
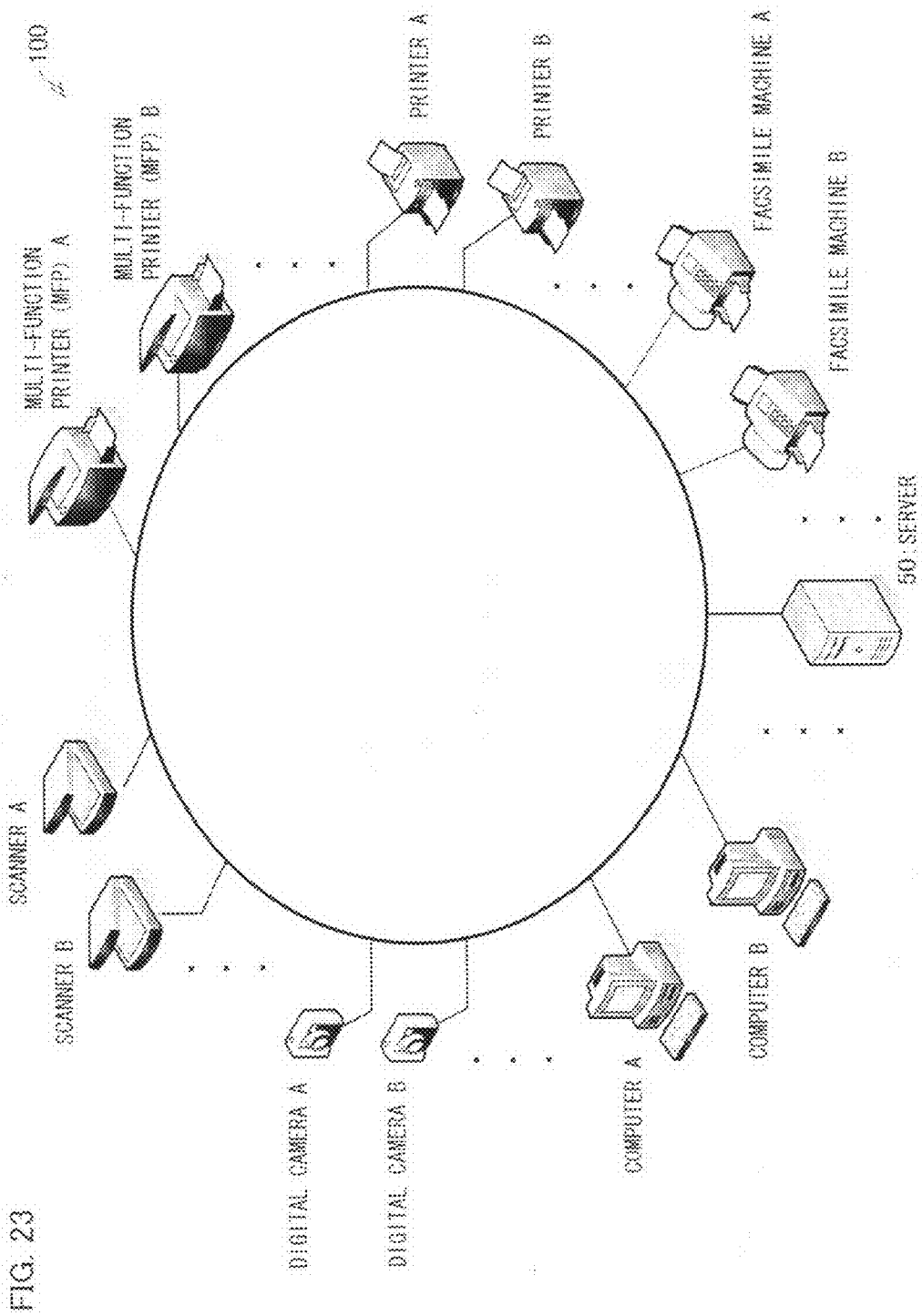
FIG. 23 is a block diagram showing an example arrangement of an image processing system according to an embodiment of the present invention.

FIG. 23 is an explanatory diagram showing an arrangement of an image processing system 100 including: a server 50 that replaces the card 93 as an external storage device; multi-function printers (MFPs) A, B, . . . ; printers A, B, . . . ; facsimiles A, B, . . . ; computers A, B, . . . ; digital cameras A, B, . . . ; and scanners A, B, . . . that are connected communicably to the server 50 via a network. According to the arrangement shown in FIG. 23, the server 50 includes an arrangement identical to the card 93 of any one of the arrangements described above. Further, each of the apparatuses connected to the server 50 via the network includes a document matching process section 13. That is, each of the multi-function printers (MFPs) A, B, . . . , the printers A, B, . . . , the facsimiles A, B, . . . , the computers A, B, . . . , the digital cameras A, B, . . . , and the scanners A, B, . . . can function as an image processing apparatus of the present invention. The arrangement of the image processing system 100 is not limited to this. For example, the image processing system 100 may include the server 50 and at least one of a multi-function printer, a printer (image forming apparatus), a facsimile, a computer, a digital camera (image reading apparatus), and a scanner (image reading apparatus).

Figure 26:
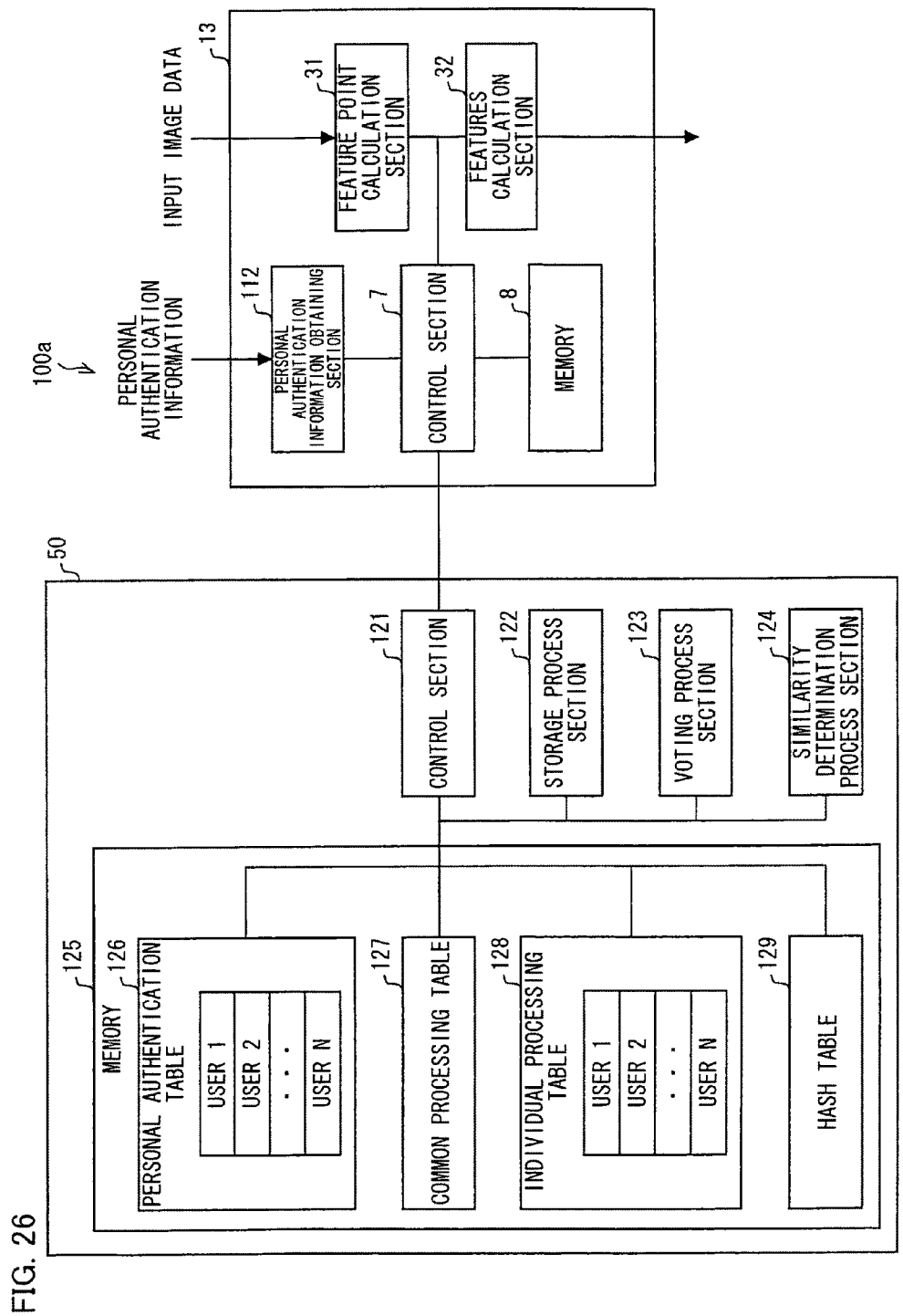
FIG. 26 is an explanatory diagram showing an example of an image processing system according to an embodiment of the present invention.

Further, it is also possible that the server 50 prestores an individual processing table therein for each user, that the digital color multi-function printer 1 transmits a user's personal authentication information and input image data to the server 50, and that in reply the server 50 sends, to the digital color multi-function printer 1, an individual processing rule, included in a group of individual processing rules stored in an individual processing table corresponding to the personal authentication information received from the digital color multi-function printer 1, which corresponds to a reference image judged to be similar to the input image data received from the digital color multi-function printer 1. FIG. 26 is a block diagram showing an example arrangement of an image processing system 100*a* constituted by a server 50 and a digital color multi-function printer 1 that perform such a process.

In the example shown in FIG. 26, the document matching process section 13 of the digital color multi-function printer 1 includes a personal authentication information obtaining section 112 in addition to the arrangement of the document matching process section 13 of FIG. 21. Further, the server 50 includes a control section 121, a storage process section 122, a voting process section 123, a similarity determination process section 124, and a memory 125. That is, in the example shown in FIG. 26, the digital color multi-function printer 1 calculates features of input image data and transmits the features to the server 50, and the server 50 performs a storage process, a voting process, and a similarity determination process.

Figure 27:
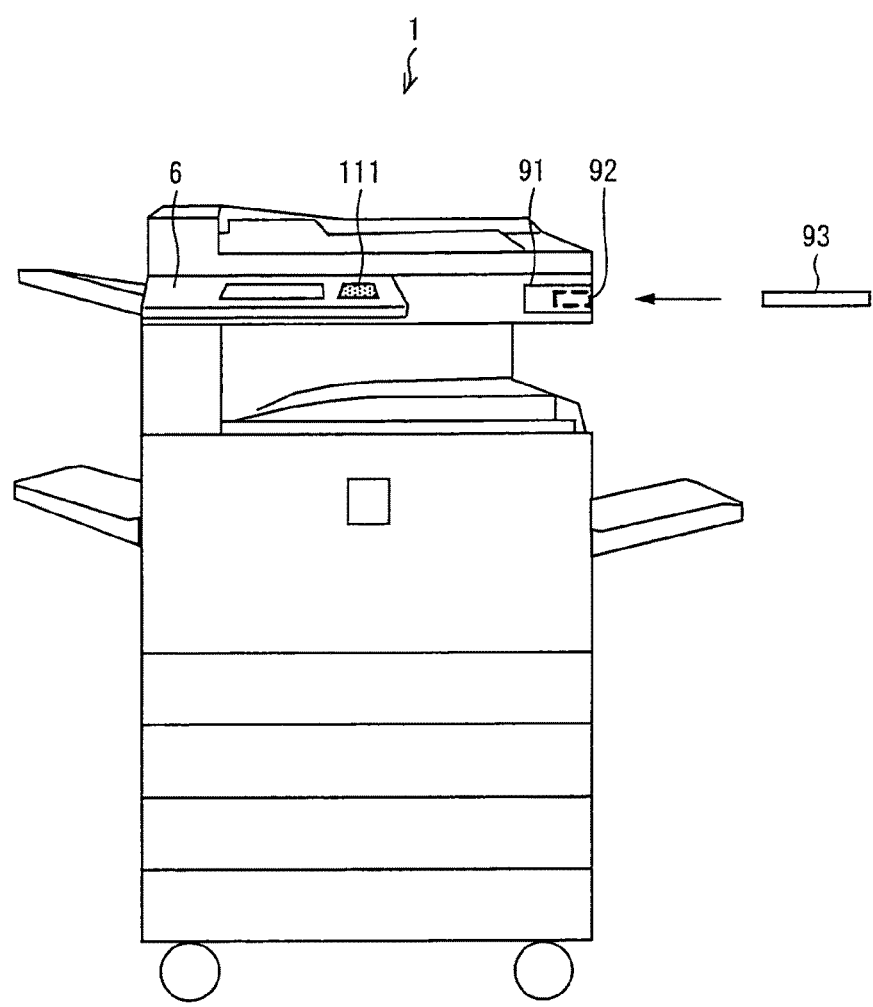
FIG. 27 is an explanatory diagram showing an example of an image processing apparatus to be provided in the image processing system of FIG. 26.

The personal authentication information obtaining section 112 obtains a user's personal authentication information. For example, as shown in FIG. 27, the operation panel 6 is provided in advance with a fingerprint reading section 111, and the fingerprint reading section 111 reads a user's fingerprint information (biometrics information) and inputs it to the personal authentication information obtaining section 112. It should be noted that the personal authentication information is not limited to fingerprint information, but may be information such as an iris, a voiceprint, or a venous pattern (biometrics information). Further, the personal authentication information may be a password, a personal identification number, or the like inputted from the user via the operation panel 6, or may be read from a card or the like in which the user's personal authentication information has been recorded. Further, it is also possible to perform an authentication process with use of plural pieces of personal authentication information. For example, it is possible to prestore plural types of personal authentication information (e.g., a fingerprint, an iris, a voiceprint, a venous pattern, a personal identification number, and a password), and to perform an authentication process with use of any types of personal authentication information (e.g., when an authentication process cannot be successfully performed with use of one type of personal authentication information, another type of personal authentication information is made available). Alternatively, it is also possible to perform an authentication process with use of a combination of plural types of personal authentication information (e.g., to perform an authentication process with use of both fingerprint information and a password).

The control section 121 of the server 50 controls operation of each of the sections of the server 50 and access to the memory 125.

The memory 125 has a personal authentication table 126, a common processing table 127, an individual processing table group 128, and a hash table 129 stored therein.

The personal authentication table 126 is a table in which a user's ID and personal authentication information are stored so as to be associated with each other.

In the common processing table 127, an index of a reference image to be stored as a commonly processed image and a common processing rule set for the commonly processed image are stored so as to be associated with each other.

In the individual processing table group 128, an individual processing table for each user is stored so as to be associated with a user ID. In an individual table for each user, an index of a reference image to be stored as an individually processed image and an individual processing rule set for the reference image are stored so as to be associated with each other.

In the hash table 129, indices of reference images to be stored respectively as an individually processed image and a commonly processed image and a hash value (features) corresponding to each feature point of these reference images are stored so as to be associated with each other.

In storing a commonly processed image, the storage process section 122 receives a hash value and an index of a reference image from the digital color multi-function printer 1, and stores the hash value and the index in the hash table 129 so that the hash value and the index are associated with each other. Also, the storage process section 122 stores, in the common processing table 127, the index of the reference image and a common processing rule set for the reference image, in such a manner that the index and the common processing rule are associated with each other. Further, in storing an individually processed image, the storage process section 122 receives a hash value and an index of a reference image from the digital color multi-function printer 1, and stores the hash value and the index in the hash table 129 so that the hash value and the index are associated with each other. Also, the storage process section 122 stores, in an individual processing table of a user corresponding to personal authentication information received from the digital color multi-function printer 1, the index of the reference image and an individual processing rule set for the reference image, in such a manner that the index and the individual processing rule are associated with each other.

Functions and arrangements of the voting process section 123 and the similarity determination process section 124 are substantially the same as those of the voting process section 33 and the similarity determination process section 34 of the document matching process section 13 of FIG. 1.

Figure 28:
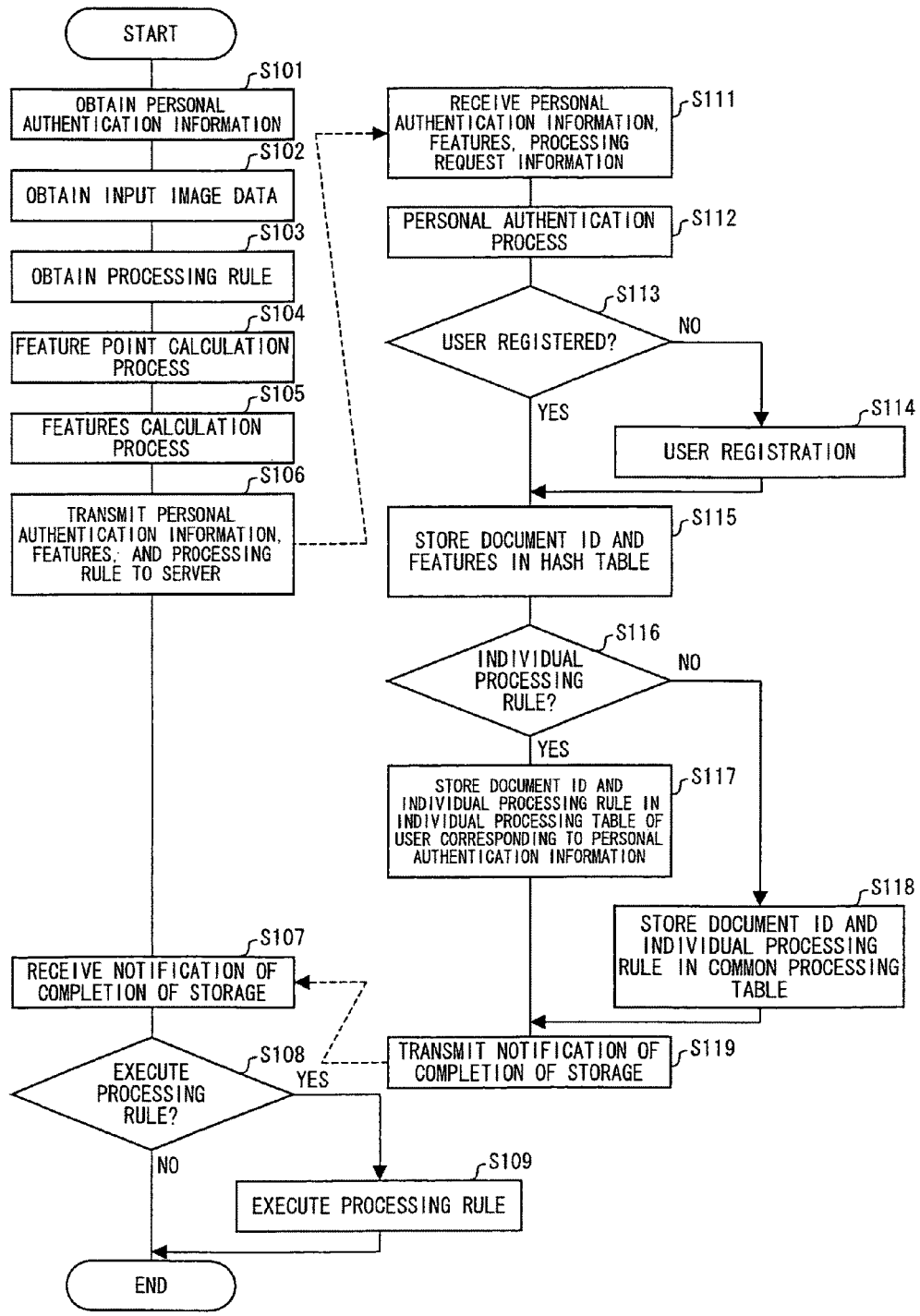
FIG. 28 is a flow chart showing the flow of a storage process in the image processing system of FIG. 26.

The following describes the flow of a process in the image processing system 100a of FIG. 26. First, FIG. 28 is a flow chart showing the flow of a storage process in the image processing system 100a.

First, the personal authentication information obtaining section 112 obtains a user's fingerprint information (personal authentication information) from the fingerprint reading section 111 (S101). The feature point calculation section 31 obtains input image data from the shading correction section 12 (S102). The control section 7 obtains a processing rule inputted from the operation panel 6 or an external device (S103). It should be noted that the processing rule contains information indicative of whether the processing rule is stored as a common processing rule or an individual processing rule.

Next, the control section 7 controls the feature point calculation section 31 and the features calculation section 32 so that the feature point calculation section 31 and the features calculation section 32 perform a feature point calculation process (S104) and a features calculation process (S105), respectively, on the input image data obtained in S102.

Next, the control section 7 causes the personal authentication information obtained in S101, the processing rule obtained in S102, and the features calculated in S105 to be transmitted to the server 50 via the communication device 5 (S106).

Upon receiving the personal authentication information, the processing rule, and the features from the digital color multi-function printer 1 (S111), the control section 121 of the server 50 performs an personal authentication process (S112) to determine whether or not the personal authentication information transmitted from the digital color multi-function printer 1 is already stored in the personal authentication table 126, i.e., whether or not the digital color multi-function printer 1 is being operated by a registered user (S113).

Then, in cases where the control section 121 determines that the digital color multi-function printer 1 is being operated by a registered user, the process proceeds to S115. In cases where the digital color multi-function printer 1 is being operated by a non-registered user, the user is registered, and then the process proceeds to S115 (S114). It should be noted that it is possible to ask the user whether or not to register and to determine the necessity of registration in accordance with an instruction from the user.

After that, the control section 121 controls the storage process section 122 so that the storage process section 122 stores, in the hash table 129, the features and the document ID that have been received from the digital color multi-function printer 1 (S115).

Further, the control section 121 determines whether or not the processing rule received from the digital color multi-function printer 1 is a common processing rule or an individual processing rule (S116). Then, in cases where the processing rule is an individual processing rule, the document ID and the processing rules are stored in an individual processing table so as to be associated with each other (S117), the individual processing table being included in a group of individual processing tables stored for respective users in the individual processing table group 128 and corresponding to the personal authentication information received from the digital color multi-function printer 1. Further, in cases where the processing rule is a common processing rule, the document ID and the processing rules are stored in the common processing table 127 so as to be associated with each other (S118). Then, after completion of the step S117 or S118, the control section 121 causes notification of completion of the storage process to be sent to the digital color multi-function printer 1 via communication means in reply (not shown).

Upon receiving the notification of completion of the storage process from the server 50, the control section 7 of the digital color multi-function printer 1 determines whether or not a process based on the processing rule thus stored is performed (S107). Then, in cases where the processing rule is not executed, the storage process is finished. Further, in cases where the processing rule is executed, the process based on the processing rule is performed (S109), and then the process is finished.

In the example shown in FIG. 28, a process based on an individual processing rule is performed as needed after completion of a process of storing a processing rule; however, the present invention is not limited to this. For example, it is possible to perform a storage process after performing a process based on a processing rule to be stored, or to concurrently perform a storage process and a process based on a processing rule.

Figure 29:
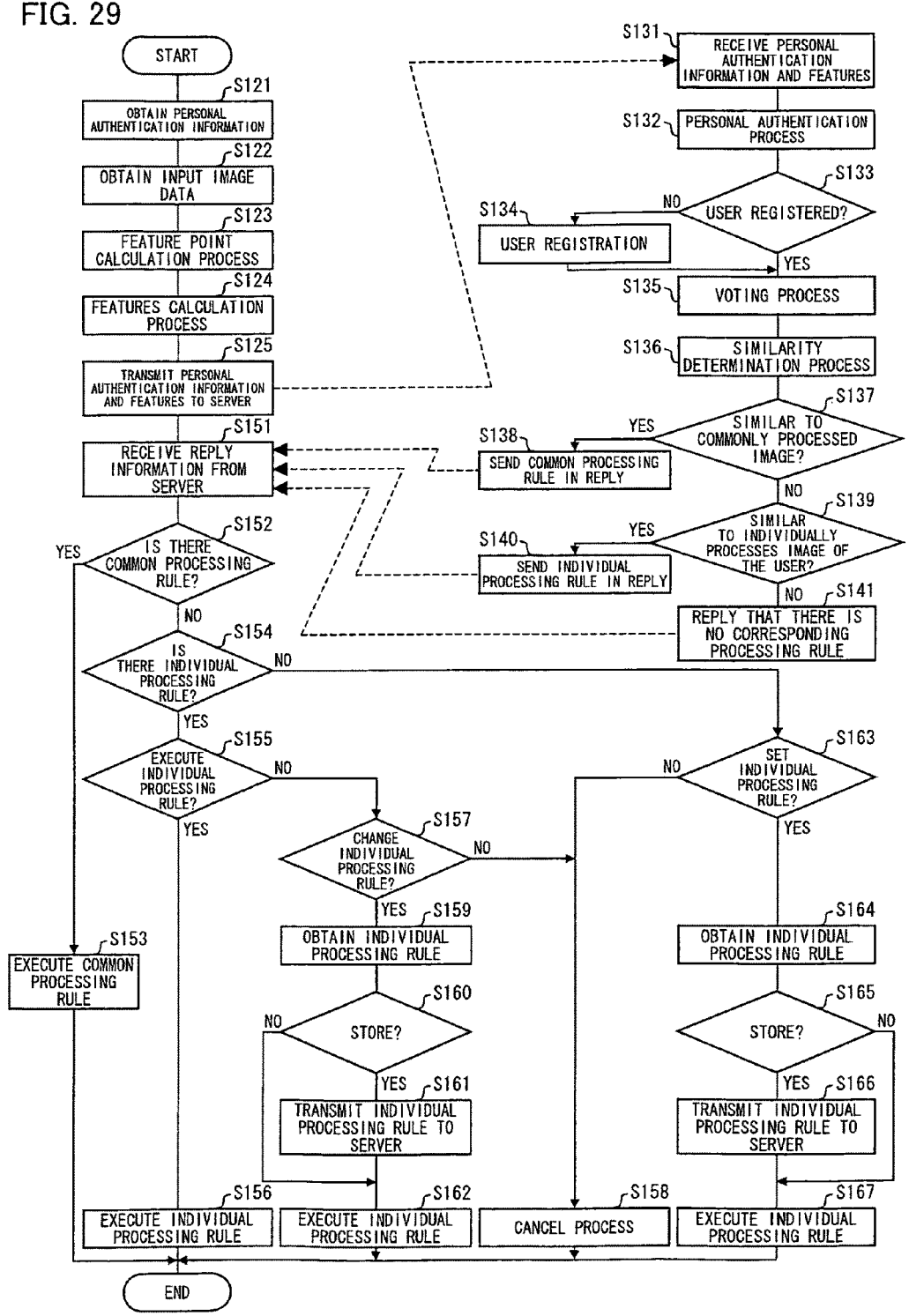
FIG. 29 is a flow chart showing the flow of a matching process in the image processing system of FIG. 26.

In the following, a matching process (similarity determination process) in the image processing system 100a will be described with reference to a flow chart shown in FIG. 29.

First, when the personal authentication information obtaining section 112 obtains a user's fingerprint information (personal authentication information) from the fingerprint reading section 111 (S121) and the feature point calculation section 31 obtains input image data from the shading correction section 12 (S122), the control section 7 controls the feature point calculation section 31 and the features calculation section 32 so that the feature point calculation section 31 and the features calculation section 32 perform a feature point calculation process (S123) and a features calculation process (S124), respectively, on the input image data obtained in S122.

After that, the control section 7 causes the personal authentication information obtained in S121 and the features calculated in S124 to be transmitted to the server 50 via the communication device 5 (S125).

Upon receiving the personal authentication information and the features from the digital color multi-function printer 1 (S131), the control section 121 of the server 50 performs an personal authentication process (S132) to determine whether or not the personal authentication information transmitted from the digital color multi-function printer 1 is already stored in the personal authentication table 126, i.e., whether or not the digital color multi-function printer 1 is being operated by a registered user (S133). Then, in cases where the control section 121 determines that the digital color multi-function printer 1 is being operated by a registered user, the process proceeds to S135 (S133). In cases where the digital color multi-function printer 1 is being operated by a non-registered user, the user is registered, and then the process proceeds to S135 (S134). It should be noted that it is possible to ask the user whether or not to register and to determine the necessity of registration in accordance with an instruction from the user.

Next, the control section 121 controls the voting process section 123 so that the voting process section 123 performs a voting process (S135), and controls the similarity determination process section 124 so that the similarity determination process section 124 performs a similarity determination process in accordance with a result of the voting process performed by the voting process section 123 (S136).

Next, the control section 121 determines, in accordance with a result of the similarity determination process, whether or not the input image data is similar to a commonly processed image (S137). Then, in cases where the control section 121 determines that the input image data is similar to a commonly processed image, a common processing rule corresponding to the commonly processed image stored in the common processing table 127 is transmitted to the digital color multi-function printer 1 in reply (S138).

Further, in cases where the control section determines in S137 that the input image data is not similar to a commonly processed image, the control section 121 determines whether or not the input image data is similar to an individually processed image stored in an individual processing table corresponding to the aforementioned user, i.e., the user who corresponds to the personal authentication information received in S131 (S139).

Then, in cases where the control section 121 determines that the input image data is similar to an individually processed image, the control section 121 reads out, from the individual processing table included in the individual processing table group 128 so as to correspond to the aforementioned user, an individual processing rule corresponding to the individually processed image, and then transmits the individual processing rule to the digital color multi-function printer 1 in reply (S140). On the other hand, in cases where the control section 121 determines that the input image data is not similar to an individually processed image, the control section 121 replies to the digital color multi-function printer 1 that there is no processing rule so stored as to correspond to the input image data (S141).

Upon receiving the reply information from the server 50 (S151), the control section 7 of the digital color multi-function printer 1 determines whether or not the reply information contains a common processing rule (S152). Then, in cases where a common processing rule is contained, a process based on the common processing rule is performed (S153), and then the operation is finished.

On the other hand, in cases where the reply information does not contain a common processing rule, the control section 7 determines whether or not an individual processing rule is contained (S154). Then, in cases where an individual processing rule is contained, the control section 7 determines whether or not a process based on the individual processing rule is performed (S155). For example, the control section 7 causes the display section of the operation panel 6 or a display section of a communicably connected external device to display the content of the individual processing rule, and asks the user whether or not to perform a process based on the individual processing rule. Then, when the user gives an instruction to perform the process, the control section 7 determines that the process based on the individual processing rule is performed.

Then, in cases where the control section 7 determines that the process based on the individual processing rule is performed, the control section 7 causes the process to be performed (S156), and then finishes the operation.

On the other hand, in cases where the control section 7 determined that the process based on the individual processing section is not performed, the control section 7 determines whether or not to perform a process after changing the individual processing rule received from the server 50 (S157). This determination is made, for example, in accordance with an instruction from the user via the operation panel 6 or the communication device 5. Then, in cases where the control section 7 determines not to perform a process after changing the individual processing rule, the control section 7 cancels the process (S158), and then finishes the operation.

On the other hand, in cases where the control section 7 determines in S157 that the process is performed after the individual processing rule is changed, the control section 7 obtains information relevant to changes in the individual processing rule from the user via the operation panel 6 or the communication device 5 (S159). Then, the control section 7 determines, in accordance with an instruction inputted from the user via the operation panel 6 or the communication device 5, whether or not to store the changes thus obtained, i.e., whether or not to change the individual processing rule corresponding to the reference image (reference image judged to be similar to the input image data) stored in the user's individual processing table included in the individual processing table group 128 of the server 50 (S160).

Then, in cases where the control section 7 determines that the changes thus obtained are stored, the control section 7 causes the individual processing rule thus changed to be transmitted to the server 50 via the communication device 5 (S161). Upon receiving the individual processing rule thus changed, the control section 121 of the server 50 updates the individual processing rule set for the reference image stored in the individual processing table of the user corresponding to the personal authentication information received in S131 (not shown).

Further, in cases where the control section 7 determines in S160 that the changes are stored, or after the transmission of the individual processing rule in S161, the control section 7 causes a process to be performed based on the individual rule thus changed (S162), and then finishes the operation.

On the other hand, in cases where the control section 7 determines in S154 that the reply information does not contain an individual processing rule, the control section 7 determines whether or not to set an individual processing rule for the input image data (S163). This determination is made in accordance with an instruction inputted from the user via the operation panel 6 or the communication device 5. Then, in cases where the control section 7 determines not to set an individual processing rule, the control section 7 cancels the process for the input image data (S158), and then finishes the operation.

Further, in cases where the control section 7 determines in S163 to set an individual processing rule, the control section 7 obtains an individual processing rule inputted from the user via the operation panel 6 or the communication device 5 (S164). Then, the control section 7 determines, in accordance with an instruction input from the user, whether or not to store the individual processing rule thus obtained (S165). Then, in cases where the control section 7 determines to store the individual processing rule, the control section 7 causes the individual processing rule to be so transmitted to the server 50 via the communication device 5 as to be stored (S166). Upon receiving the individual processing rule to be stored, the control section 121 of the server 50 controls the storage process section 22 so that the storage process section 22 stores, in the hash table 129, the document ID and the features that have been received in S131, and stores the document ID and the individual processing rule in the individual processing table of the user corresponding to the personal authentication information received in S131, in such a manner that the document ID and the individual processing rule are associated with each other (neither shown).

Then, in cases where the control section 7 determines in S165 not to store the individual processing rule, or after the transmission of the individual processing rule in S166, the control section 7 causes a process to be performed based on the individual processing rule obtained in S164 (S167), and then finishes the operation.

Thus, the image processing system 100a of FIG. 26 is arranged such that: the server 50 prestores an individual processing table therein for each user; and the digital color multi-function printer 1 authenticates a user in performing a process on input image data, reads out an individual processing rule for the user, and executes the individual processing rule. This enables a user who is not taking along an external storage device to use various functions with use of a process of determination of similar images in a setting according to the user's needs.

The scanner includes a scanner platen, an optical scanning section, CCD (charge coupled device) etc. The scanner scans a document image on the scanner platen with use of the optical scanning section, thereby reading the document image and generating image data. The digital camera includes an image-capture lens, a CCD (image input device) etc. The digital camera captures a document image, a person image, a landscape image etc. and generates image data. The scanner and the digital camera may have a function for performing a predetermined image process (such as various correction processes) in order to reproduce an image suitably. The printer prints on a sheet (recording paper) an image according to image data generated by the computer, the scanner, and the digital camera. The facsimile performs a process such as a binary process, a resolution conversion process, and a rotation process on image data supplied from the image input apparatus to obtain image data encoded into a predetermined format and sends the image data to the other end, or the facsimile receives image data from the other end, decodes the image data, performs a rotation process, a resolution conversion process, and a halftone process on the image data in accordance with performance of an image output apparatus, and outputs the image data as an image per page. The multi-function printer includes at least two functions out of a scanner function, a facsimile transmission function, and a printing function (copy function, printer function). The computer edits image data read by the scanner and the digital camera, or generates a document with use of application software.

Further, in each of the embodiments described above, input image data may be computerized data obtained by converting scanner-read data into a predetermined file format such as JPEG or PDF, or may be electronic data created by various types of application software.

Further, although each of the embodiments described above assumes that features of a reference image and a document ID of the reference image are prestored and a process of matching input image data with the reference image (process of determining a similarity between the input image data and the reference image) is performed by comparing features of the input image data with the features of the reference image, the present invention is not limited to this. For example, it is also possible to prestore, in the server, electronic data created by various types of application software or computerized data obtained by converting scanner-read data into a predetermined file format such as JPEG or PDF, and to perform a process of matching input image data with the electronic data or the computerized data (process of determining a similarity between the input image data and the electronic data or the computerized data) by comparing the input image data with the electronic data or the computerized data. In this case, it is preferable that the electronic data or the computerized data be prestored for each file format and for each piece of electronic data.

It is possible to use any type of application software as the application software by which the electronic data is created. For example, the application software may be application software for creating PDL (page-description language) data. In this case, the electronic data may be used in the matching process after being converted into a raster image (RGB data) via an RIP (raster image processor).

Further, the computerized data may be data of an encoded image format such as JPEG or GIF. In this case, for example, the matching process may be performed after the encoded image format is subjected to decoding and, furthermore, to color data conversion from YCC signals into RGB signals as needed.

Further, the computerized data may be RDF data. In the case of a PDF format, data of an object (such as a text, a figure, or a picture) is retained as a tag. For example, in cases where the object is a text, information on the number of points, color, display position, and the like is retained separately from the tag as information related to the object. In cases where the object is a picture, information on an encoding method, size, display position, and the like is retained separately from the tag as information related to the object. In view of this, in cases where the computerized data is RDF data, e.g., in cases where an encoded image format is saved as the tag, the matching process may be performed after the tag is decoded and then converted into RGB signals. Further, as for a portion other than the tag (e.g., a vector data portion such as a font), the matching process may be performed after the portion is converted into RGB image data via an RIP or the like.

Further, in each of the embodiments described above, each section (each block) provided in the digital color multi-function printer 1, the card (external storage device) 93, and the server 50 is realized by software with use of a processor such as a CPU. That is, each of the digital color multi-function printer 1, the card 93, and the server 50 includes: a CPU for executing an instruction of a control program for realizing various functions; a ROM in which the program has been stored; a RAM for expanding the program; and a storage device (storage medium), such as a memory, in which the program and various data are stored. The object of the present invention can also be achieved by providing each of the digital color multi-function printer 1, the card 93, and the server 50 with a storage medium in which a program code (executable program, intermediate code, or source program) of the control program of each of the digital color multi-function printer 1, the card (external storage device) 93, and the server 50 has been stored in a computer readable manner, and by causing the computer (CPU or MPU) to read and execute the program code stored in the storage medium, the program code serving as software for realizing the aforementioned functions.

Examples of the storage medium include: a tape such as a magnetic tape or a cassette tape; a magnetic disk such as a Floppy® disk or a hard disk; an optical disk such as a CD-ROM, an MO, an MD, a DVD, or a CD-R; a card such as an IC card (inclusive of a memory card) or an optical card; and a semiconductor memory such as a mask ROM, an EPROM, an EEPROM, or a flash ROM.

Further, each of the digital color multi-function printer 1, the card 93, and the server 50 may be arranged so as to be connectable to a communication network so that the program code is supplied to each of the digital color multi-function printer 1, the card 93, and the server 50 through the communication network. The communication network is not particularly limited. Examples of the communication network include, but are not particularly limited to, the Internet, an intranet, an extranet, a LAN (local area network), an ISDN (integrated services digital network), a VAN (value added network), a CATV (cable TV) communication network, a virtual private network, a telephone network, a mobile communication network, and a satellite communication network. Further, usable examples of a transmission medium that constitutes the communication network include, but are not particularly limited to, a cable medium such as IEEE 1394, a USB, power line communication, a cable TV line, a telephone line, or an ADSL line and a wireless medium such as IrDA, infrared rays used for a remote controller, Bluetooth®, IEEE 802.11, HDR (High Data Rate), a mobile phone network, satellite connection, or a terrestrial digital network. It should be noted that the present invention can also be realized in the form of a computer data signal realized by electronic transmission of the program code and embedded in a carrier wave.

Furthermore, each of the digital color multi-function printer 1, the card 93, and the server 50 may be realized by hardware logic. Each block of each of the digital color multi-function printer 1, the card 93, and the server 50 may be a combination of hardware carrying out some of the processes and the computing means controlling the hardware and executing program code for the other processes.

The image processing system (computer system) of the present invention may be composed of: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means for connecting a server etc. via a network.

A first image processing apparatus of the present invention is an image processing apparatus including: an input data obtaining section for obtaining input image data; a features extracting section for extracting features of the input image data; an information obtaining section for obtaining features of a reference image from an information storage device connected communicably to the image processing apparatus; a similarity determination section for comparing the features of the input image data with the features of the reference image to determine whether or not the input image data is similar to the reference image; and a control section for controlling operation of a processing section for performing a process on the input image data in accordance with a result determined by the similarity determination section, the information obtaining section obtaining, from the information storage device, processing rule information indicating processing content to be applied to input image data judged to be similar to the reference image, the control section controlling, in accordance with the processing rule information corresponding to the reference image, content of a process the processing section performs on the input image data judged to be similar to the reference image.

Further a second image processing apparatus of the present invention is an image processing apparatus, including an input data obtaining section for obtaining input image data and a features extracting section for extracting features of the input image data, which includes: an information transmitting section for transmitting, to an information storage device connected communicably to the image processing apparatus, those features of the input image data which have been extracted by the features extracting section; an information obtaining section for obtaining, from the information storage device, processing rule information indicating processing content to be applied to the input image data; and a control section for controlling, in accordance with the processing rule information, operation of a processing section for performing a process on the input image data.

It should be noted that the processing section may be provided inside of the image processing apparatus or connected communicably to the image processing apparatus. Further, the processing section may perform, on the input image data, any one of a copying process, a printing process, an electronic distribution process, a facsimile transmission process, a filing process, an image correction process, a scaling-up/down process, a rotation process, a translation process, a trimming process, a process for combining another image, a data-format conversion process, and an encoding process or a combination of two or more of the processes. Further, the input data obtaining section may obtain input image data, for example, by reading a document with a scanner, may obtain input image data created by inputting necessary information into a format of electronic data with use of software, may obtain input image data created directly as electronic data, or may obtain input image data transmitted from another apparatus connected communicably to the image processing apparatus. Further, the information storage device may be mounted detachably on the image processing apparatus, or may be connected communicably to the image processing apparatus via cable or wirelessly.

The first image processing apparatus is arranged such that: the input data obtaining section obtains input image data; the features extracting section extracts features of the input image data; the information obtaining section obtains features of a reference image from an information storage device connected communicably to the first image processing apparatus; and the similarity determination section compares the features of the input image data with the features of the reference image to determine whether or not the input image data is similar to the reference image. Further, the information obtaining section obtains, from the information storage device, processing rule information indicating processing content to be applied to input image data judged to be similar to the reference image, and the control section controls, in accordance with the processing rule information corresponding to the reference image, the content of a process the processing section performs on the input image data judged to be similar to the reference image.

Further, the second image processing apparatus is arranged such that: the input data obtaining section obtains input image data; the features extracting section extracts features of the input image data; and the information transmitting section transmits the features of the input image data to an information storage device connected communicably to the second image processing apparatus. Moreover, the information obtaining section obtains, from the information storage device, processing rule information indicating processing content to be applied to the input image data, and the control section controls, in accordance with the processing rule information corresponding to a reference image judged to be similar to the input image data, the operation of the processing section for performing a process on the input image data.

With this, according to each of the first and second image processing apparatuses, the process to be performed on the input image data judged to be similar to the reference image can be controlled in accordance with the processing rule information, stored in the information storage device, which corresponds to the reference image. This makes it possible to simplify an operation for a user to set the content of a process to be performed on input image data, and to improve user-friendliness. Further, since the features of the reference image and the processing rule information can be prestored in the information storage device, the required memory capacity of storage means of the image processing apparatus can be reduced in comparison with cases where these pieces of information are stored in the storage means of the image processing apparatus. Further, for example, features of reference images and processing rule information can be stored dispersedly in a plurality of information storage devices. In this case, for example, when stored in each information storage device, features of a reference image and a processing rule can be set according to the needs of a user who owns or uses the information storage device.

Further, either of the image processing apparatuses may be arranged so as to further include: a display section for displaying information; and an instruction input section for receiving an instruction input from a user, wherein the control section causes the display section to display the processing content indicated by the processing rule information and, when the instruction input section receives an instruction to perform a process based on the processing content, causes the processing section to perform, on the input image data, the process based on the processing content.

According to the foregoing arrangement, processing content based on processing rule information is presented to the user, and a process based on the processing content is performed in accordance with an execution instruction given from the user. This makes it possible to prevent a process unwanted by the user from being performed on input image data.

Further, the first image processing apparatus may be arranged so as to further include an information storage section containing (i) features of a second reference image and (ii) common processing rule information indicating processing content to be applied, regardless of the processing rule information obtained from the information storage device, to input image data judged to be similar to the second reference image, wherein: the similarity determination section compares the features of the input image data with the features of the second reference image to determine whether or not the input image data is similar to the second reference image; and the control section controls, in accordance with the common processing rule information corresponding to the second reference image, content of a process the processing section performs on the input image data judged to be similar to the second reference image.

According to the foregoing arrangement, the input image data judged to be similar to the second reference image can be processed in accordance with the processing content provided by the common processing rule information, regardless of the processing rule information obtained from the information storage device.

Further, the second image processing apparatus may be arranged so as to further include: an information storage section containing (i) features of a second reference image and (ii) common processing rule information indicating processing content to be applied, regardless of the processing rule information obtained from the information storage device, to input image data judged to be similar to the second reference image; and a similarity determination section for comparing the features of the input image data with the features of the second reference image to determine whether or not the input image data is similar to the second reference image, wherein the control section controls, in accordance with the common processing rule information corresponding to the second reference image, content of a process the processing section performs on the input image data judged to be similar to the second reference image.

According to the foregoing arrangement, the input image data judged to be similar to the second reference image can be processed in accordance with the processing content provided by the common processing rule information, regardless of the processing rule information obtained from the information storage device.

Further, the second image processing apparatus may be arranged so as to further include an information storage section containing (i) features of a second reference image and (ii) common processing rule information indicating processing content to be applied, regardless of the processing rule information obtained from the information storage device, to input image data judged to be similar to the second reference image, wherein before transmitting the features of the input image data to the information storage device, the information transmitting section transmits (i) the features of the second reference image and (ii) the common processing rule information from the information storage section to the information storage device.

The foregoing arrangement makes it possible not only to determine whether or not the input image data is similar to the reference image, but also to determine whether or not the input image data is similar to the second reference image in the information storage device. Therefore, the arrangement in which the processing rule information to be transmitted to the image processing apparatus is determined in accordance with a result of similarity determination the information storage device makes with respect to the reference image and the second reference image makes it possible to control, in accordance with the result of similarity determination with respect to the reference image and the second reference image, the content of a process to be performed on the input image data.

Further, either of the image processing apparatuses may be arranged so as to further include: an authentication storage section containing identification information of a user permitted to perform an editing process on information stored in the information storage section; an instruction input section for receiving an instruction input from a user; and a user authentication section for determining, in accordance with information inputted from the instruction input section and identification information stored in the authentication storage section, whether or not a user having inputted the information to the instruction input section is permitted to edit information stored in the information storage section.

The foregoing arrangement makes it possible to prevent the features of the second reference image and the common processing rule information from being arbitrarily edited by the general public.

Further, either of the image processing apparatuses may be arranged such that the processing content indicated by the common processing rule information is to prohibit or limit execution of a process on the input image data.

The foregoing arrangement makes it possible to prohibit or limit the execution of a process on the input image data.

An image processing system of the present invention is an image processing system including: an image processing apparatus which includes an input data obtaining section for obtaining input image data and a control section for controlling content of a process to be performed on the input image data; and an information storage device which includes a storage section for storing features of a reference image, at least either of the image processing apparatus and the information storage device including (i) a features extracting section for extracting features of the input image data and (ii) a similarity determination section for comparing the features of the input image data with the features of the reference image to determine whether or not the input image data is similar to the reference image, the storage section containing, in addition to the features of the reference image, processing rule information indicating processing content to be applied to input image data judged to be similar to the reference image, the control section controlling, in accordance with the processing rule information corresponding to the reference image, a process to be performed on the input image data judged to be similar to the reference image.

The foregoing arrangement is such that: the input data obtaining section obtains input image data; the features extracting section extracts features of the input image; and the similarity determination section compares the features of the input image data with features of a reference image to determine the input image data is similar to the reference image. Further, the storage section contains the features of the reference image and the processing rule information indicating processing content to be applied to input image data judged to be similar to the reference image, and the control section controls, in accordance with the processing rule information corresponding to the reference image, a process to be performed on the input image data judged to be similar to the reference image.

With this, the process to be performed on the input image data judged to be similar to the reference image can be controlled in accordance with the processing rule information, stored in the information storage device, which corresponds to the reference image. This makes it possible to simplify an operation for a user to set the content of a process to be performed on input image data, and to improve user-friendliness. Further, since the features of the reference image and the processing rule information can be prestored in the information storage device, the required memory capacity of storage means of the image processing apparatus can be reduced in comparison with cases where these pieces of information are stored in the storage means of the image processing apparatus. Further, for example, features of reference images and processing rule information can be stored dispersedly in a plurality of information storage devices. In this case, for example, when stored in each information storage device, features of a reference image and a processing rule can be set according to the needs of a user who owns or uses the information storage device.

The image processing system of the present invention may be arranged such that: the image processing apparatus includes a personal authentication information obtaining section for obtaining a user's personal authentication information; at least either of the image processing apparatus and the information storage device includes (i) a personal authentication information storage section in which a user ID and a user's personal authentication information have been stored so as to be associated with each other and (ii) a personal authentication process section for making a comparison between the personal authentication information obtained by the personal authentication information obtaining section and the personal authentication information stored in the personal authentication information storage section, and for detecting a user ID corresponding to the personal authentication information obtained by the personal authentication information obtaining section; and after the user ID corresponding to the personal authentication information obtained by the personal authentication information obtaining section is detected, the control section controls, in accordance with the processing rule information corresponding to the reference image, the process to be performed on the input image data judged to be similar to the reference image.

According to the foregoing arrangement, a process based on prestored processing rule information can be performed in cases where a pre-registered user inputs input image data.

The image processing system of the present invention may be arranged such that: at least part of the processing rule information is individual processing rule information set individually for each user; the storage section has the individual processing rule information stored therein so as to be associated with a user ID of a user corresponding to the individual processing rule information; and in accordance with individual processing rule information which corresponds to the reference image judged to be similar to the input image data, from among the individual processing rule information associated with the user ID detected by the personal authentication process section, the control section controls the process to be performed on the input image data.

The foregoing arrangement makes it possible to specify a user who has inputted input image data, and to control, in accordance with individual processing rule information corresponding to the user, a process to be performed on the input image data.

Further, the personal authentication information may be biometrics information. The foregoing arrangement makes it possible to more accurately perform a user authentication process. Further, since it is not necessary for a user to store a personal identification number, a password, or the like, there can be improvements in user-friendliness.

An image processing method of the present invention is a method for processing an image in an image processing system including (i) an image processing apparatus which includes an input data obtaining section for obtaining input image data and a control section for controlling content of a process to be performed on the input image data and (ii) an information storage device which includes a storage section for storing features of a reference image, the method including: a features extracting step of extracting features of the input image data; a similarity determination step of comparing the features of the input image data with the features of the reference image to determine whether or not the input image data is similar to the reference image; a processing rule obtaining step in which the image processing apparatus obtains, from the information storage device, processing rule information, stored in the storage section, which indicates processing content to be applied to input image data judged to be similar to the reference image; and a process control step of controlling, in accordance with the processing rule information corresponding to the reference image, a process to be performed on the input image data judged to be similar to the reference image.

According to the foregoing method, the features of the input image data obtained by the input data obtaining section are extracted in the features extracting step, and whether or not the input image data is similar to the reference image is determined in the similarity determination step by comparing the features of the input image data with those features of the reference image which are stored in the storage section of the information storage device. Further, in the processing rule obtaining step, the image processing apparatus obtains from the information storage device the processing rule information, stored in the information storage device, which indicates processing content to be applied to input image data judged to be similar to the reference image. Then, in the process control step, the process to be performed on the input image data judged to be similar to the reference image is controlled in accordance with the processing rule information corresponding to the reference image.

With this, the process to be performed on the input image data judged to be similar to the reference image can be controlled in accordance with the processing rule information, stored in the storage section of the information storage device, which corresponds to the reference image. This makes it possible to simplify an operation for a user to set the content of a process to be performed on input image data, and to improve user-friendliness. Further, since the features of the reference image and the processing rule information can be prestored in the information storage device, the required memory capacity of storage means of the image processing apparatus can be reduced in comparison with cases where these pieces of information are stored in the storage means of the image processing apparatus. Further, for example, features of reference images and processing rule information can be stored dispersedly in a plurality of information storage devices. In this case, for example, when stored in each information storage device, features of a reference image and a processing rule can be set according to the needs of a user who owns or uses the information storage device.

An image forming apparatus of the present invention includes either of the image processing apparatuses and an image output section for forming an image on a recording material in accordance with input image data. Further, an image transmitting apparatus of the present invention includes either of the image processing apparatuses and a transmitting apparatus for transmitting input image data to another apparatus connected communicably thereto. Further, an image reading apparatus of the present invention includes an image input apparatus for obtaining input image data by reading a document image and either of the image processing apparatuses.

According to the image forming apparatus, the image transmitting apparatus, and the image reading apparatus, the process to be performed on the input image data judged to be similar to the reference image can be controlled in accordance with the processing rule information, stored in the storage section of the information storage device, which corresponds to the reference image. This makes it possible to simplify an operation for a user to set the content of a process to be performed on input image data, and to improve user-friendliness. Further, since the features of the reference image and the processing rule information can be prestored in the information storage device, the required memory capacity of storage means of the image processing apparatus can be reduced in comparison with cases where these pieces of information are stored in the storage means of the image processing apparatus. Further, for example, features of reference images and processing rule information can be stored dispersedly in a plurality of information storage devices. In this case, for example, when stored in each information storage devices, features of a reference image and a processing rule can be set according to the needs of a user who owns or uses the information storage device.

It should be noted that the image processing apparatus may be realized by a computer. In this case, a program for realizing the image processing apparatus with a computer by operating the computer as each of the sections and a computer-readable recoding medium containing the program are encompassed in the scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus comprising:
    an input data obtaining section for obtaining input image data;
    a features extracting section for extracting features of the input image data;
    an information obtaining section for obtaining features of a reference image from an information storage device connected communicably to the image processing apparatus;
    a similarity determination section for comparing the features of the input image data with the features of the reference image to determine whether or not the input image data is similar to the reference image; and
    a control section for controlling operation of a processing section for performing a process on the input image data in accordance with a result determined by the similarity determination section,
    the information obtaining section obtaining, from the information storage device, processing rule information indicating processing content to be applied to input image data judged to be similar to the reference image,
    the control section controlling, in accordance with the processing rule information corresponding to the reference image, content of a process the processing section performs on the input image data judged to be similar to the reference image.

2. The image processing apparatus as set forth in claim 1, wherein the processing section performs, on the input image data, any one of a copying process, a printing process, an electronic distribution process, a facsimile transmission process, a filing process, an image correction process, a scaling-up/down process, a rotation process, a translation process, a trimming process, a process for combining another image, a data-format conversion process, and an encoding process or a combination of two or more of the processes.

3. The image processing apparatus as set forth in claim 1, further comprising:
    a display section for displaying information; and
    an instruction input section for receiving an instruction input from a user, wherein
    the control section causes the display section to display the processing content indicated by the processing rule information and, when the instruction input section receives an instruction to perform a process based on the processing content, causes the processing section to perform, on the input image data, the process based on the processing content.

4. The image processing apparatus as set forth in claim 1, further comprising an information storage section containing (i) features of a second reference image and (ii) common processing rule information indicating processing content to be applied, regardless of the processing rule information obtained from the information storage device, to input image data judged to be similar to the second reference image, wherein:
    the similarity determination section compares the features of the input image data with the features of the second reference image to determine whether or not the input image data is similar to the second reference image; and
    the control section controls, in accordance with the common processing rule information corresponding to the second reference image, content of a process the processing section performs on the input image data judged to be similar to the second reference image.

5. The image processing apparatus as set forth in claim 4, further comprising:
an authentication storage section containing identification information of a user permitted to perform an editing process on information stored in the information storage section;
an instruction input section for receiving an instruction input from a user; and
a user authentication section for determining, in accordance with information inputted from the instruction input section and identification information stored in the authentication storage section, whether or not a user having inputted the information to the instruction input section is permitted to edit information stored in the information storage section.

6. The image processing apparatus as set forth in claim 4, wherein the processing content indicated by the common processing rule information is to prohibit or limit execution of a process on the input image data.

7. An image processing apparatus including an input data obtaining section for obtaining input image data and a features extracting section for extracting features of the input image data, comprising:
an information transmitting section for transmitting, to an information storage device connected communicably to the image processing apparatus, those features of the input image data which have been extracted by the features extracting section;
an information obtaining section for obtaining, from the information storage device, processing rule information indicating processing content to be applied to the input image data; and
a control section for controlling, in accordance with the processing rule information, operation of a processing section for performing a process on the input image data.

8. The image processing apparatus as set forth in claim 7, wherein the processing section performs, on the input image data, any one of a copying process, a printing process, an electronic distribution process, a facsimile transmission process, a filing process, an image correction process, a scaling-up/down process, a rotation process, a translation process, a trimming process, a process for combining another image, a data-format conversion process, and an encoding process or a combination of two or more of the processes.

9. The image processing apparatus as set forth in claim 7, further comprising:
a display section for displaying information; and
an instruction input section for receiving an instruction input from a user, wherein
the control section causes the display section to display the processing content indicated by the processing rule information and, when the instruction input section receives an instruction to perform a process based on the processing content, causes the processing section to perform, on the input image data, the process based on the processing content.

10. The image processing apparatus as set forth in claim 7, further comprising:
an information storage section containing (i) features of a second reference image and (ii) common processing rule information indicating processing content to be applied, regardless of the processing rule information obtained from the information storage device, to input image data judged to be similar to the second reference image; and
a similarity determination section for comparing the features of the input image data with the features of the second reference image to determine whether or not the input image data is similar to the second reference image, wherein
the control section controls, in accordance with the common processing rule information corresponding to the second reference image, content of a process the processing section performs on the input image data judged to be similar to the second reference image.

11. The image processing apparatus as set forth in claim 10, further comprising:
an authentication storage section containing identification information of a user permitted to perform an editing process on information stored in the information storage section;
an instruction input section for receiving an instruction input from a user; and
a user authentication section for determining, in accordance with information inputted from the instruction input section and identification information stored in the authentication storage section, whether or not a user having inputted the information to the instruction input section is permitted to edit information stored in the information storage section.

12. The image processing apparatus as set forth in claim 10, wherein the processing content indicated by the common processing rule information is to prohibit or limit execution of a process on the input image data.

13. The image processing apparatus as set forth in claim 7, further comprising an information storage section containing (i) features of a second reference image and (ii) common processing rule information indicating processing content to be applied, regardless of the processing rule information obtained from the information storage device, to input image data judged to be similar to the second reference image, wherein
before transmitting the features of the input image data to the information storage device, the information transmitting section transmits (i) the features of the second reference image and (ii) the common processing rule information from the information storage section to the information storage device.

14. An image processing system comprising:
an image processing apparatus which includes an input data obtaining section for obtaining input image data and a control section for controlling content of a process to be performed on the input image data; and
an information storage device which includes a storage section for storing features of a reference image,
at least either of the image processing apparatus and the information storage device including (i) a features extracting section for extracting features of the input image data and (ii) a similarity determination section for comparing the features of the input image data with the features of the reference image to determine whether or not the input image data is similar to the reference image,
the storage section containing, in addition to the features of the reference image, processing rule information indicating processing content to be applied to input image data judged to be similar to the reference image,
the control section controlling, in accordance with the processing rule information corresponding to the reference image, a process to be performed on the input image data judged to be similar to the reference image.

15. The image processing system as set forth in claim 14, wherein:
- the image processing apparatus includes a personal authentication information obtaining section for obtaining a user's personal authentication information;
- at least either of the image processing apparatus and the information storage device includes (i) a personal authentication information storage section in which a user ID and a user's personal authentication information have been stored so as to be associated with each other and (ii) a personal authentication process section for making a comparison between the personal authentication information obtained by the personal authentication information obtaining section and the personal authentication information stored in the personal authentication information storage section, and for detecting a user ID corresponding to the personal authentication information obtained by the personal authentication information obtaining section; and
- after the user ID corresponding to the personal authentication information obtained by the personal authentication information obtaining section is detected, the control section controls, in accordance with the processing rule information corresponding to the reference image, the process to be performed on the input image data judged to be similar to the reference image.

16. The image processing system as set forth in claim 15, wherein:
- at least part of the processing rule information is individual processing rule information set individually for each user;
- the storage section has the individual processing rule information stored therein so as to be associated with a user ID of a user corresponding to the individual processing rule information; and
- in accordance with individual processing rule information which corresponds to the reference image judged to be similar to the input image data, from among the individual processing rule information associated with the user ID detected by the personal authentication process section, the control section controls the process to be performed on the input image data.

17. The image processing system as set forth in claim 15, wherein the personal authentication information is biometrics information.

18. A method for processing an image in an image processing system including (i) an image processing apparatus which includes an input data obtaining section for obtaining input image data and a control section for controlling content of a process to be performed on the input image data and (ii) an information storage device which includes a storage section for storing features of a reference image, the method comprising:
- a features extracting step of extracting features of the input image data;
- a similarity determination step of comparing the features of the input image data with the features of the reference image to determine whether or not the input image data is similar to the reference image;
- a processing rule obtaining step in which the image processing apparatus obtains, from the information storage device, processing rule information, stored in the storage section, which indicates processing content to be applied to input image data judged to be similar to the reference image; and
- a process control step of controlling, in accordance with the processing rule information corresponding to the reference image, a process to be performed on the input image data judged to be similar to the reference image.

19. An image forming apparatus comprising:
- an image processing apparatus which includes (i) an input data obtaining section for obtaining input image data, (ii) a features extracting section for extracting features of the input image data, (iii) an information obtaining section for obtaining features of a reference image from an information storage device connected communicably to the image processing apparatus, (iv) a similarity determination section for comparing the features of the input image data with the features of the reference image to determine whether or not the input image data is similar to the reference image, and (v) a control section for controlling operation of a processing section for performing a process on the input image data in accordance with a result determined by the similarity determination section, the information obtaining section obtaining, from the information storage device, processing rule information indicating processing content to be applied to input image data judged to be similar to the reference image, the control section controlling, in accordance with the processing rule information corresponding to the reference image, content of a process the processing section performs on the input image data judged to be similar to the reference image; and
- an image output section for forming an image on a recording material in accordance with input image data.

20. An image forming apparatus comprising:
- an image processing apparatus, including (i) an input data obtaining section for obtaining input image data, (ii) a features extracting section for extracting features of the input image data, (iii) an information transmitting section for transmitting, to an information storage device connected communicably to the image processing apparatus, those features of the input image data which have been extracted by the features extracting section, (iv) an information obtaining section for obtaining, from the information storage device, processing rule information indicating processing content to be applied to the input image data, and (v) a control section for controlling, in accordance with the processing rule information, operation of a processing section for performing a process on the input image data; and
- an image output section for forming an image on a recording material in accordance with input image data.

21. A computer-readable recording medium containing a program for operating an image processing apparatus which includes (i) an input data obtaining section for obtaining input image data, (ii) a features extracting section for extracting features of the input image data, (iii) an information obtaining section for obtaining features of a reference image from an information storage device connected communicably to the image processing apparatus, (iv) a similarity determination section for comparing the features of the input image data with the features of the reference image to determine whether or not the input image data is similar to the reference image, and (v) a control section for controlling operation of a processing section for performing a process on the input image data in accordance with a result determined by the similarity determination section, the information obtaining section obtaining, from the information storage device, processing rule information indicating processing content to be applied to input image data judged to be similar to the reference image, the control section controlling, in accordance with the processing rule information corresponding to the reference image, content of a process the processing section performs on the input image data judged to be similar to the reference image, the program causing a computer to function as each of the sections.

22. A computer-readable recording medium containing a program for operating an image processing apparatus which includes (i) an input data obtaining section for obtaining input image data, (ii) a features extracting section for extracting features of the input image data, (iii) an information transmitting section for transmitting, to an information storage device connected communicably to the image processing apparatus, those features of the input image data which have been extracted by the features extracting section, (iv) an information obtaining section for obtaining, from the information storage device, processing rule information indicating processing content to be applied to the input image data, and (v) a control section for controlling, in accordance with the processing rule information, operation of a processing section for performing a process on the input image data, the program causing a computer to function as each of the sections.

* * * * *